US012607528B2

(12) United States Patent
Suzuki et al.

(10) Patent No.: US 12,607,528 B2
(45) Date of Patent: Apr. 21, 2026

(54) TORQUE DETECTION DEVICE

(71) Applicant: DENSO CORPORATION, Kariya-city (JP)

(72) Inventors: Toshiro Suzuki, Kariya-city (JP);
Michihiro Makita, Kariya-city (JP);
Koichiro Matsumoto, Kariya-city (JP);
Kazuhiro Yoshino, Kariya-city (JP);
Norihisa Koide, Kariya-city (JP);
Nagisa Onoda, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 308 days.

(21) Appl. No.: 18/410,036

(22) Filed: Jan. 11, 2024

(65) Prior Publication Data

US 2024/0142324 A1 May 2, 2024

Related U.S. Application Data

(63) Continuation of application No. PCT/JP2022/031610, filed on Aug. 22, 2022.

(30) Foreign Application Priority Data

Aug. 24, 2021 (JP) .................................. 2021-136583

(51) Int. Cl.
*G01L 3/10* (2006.01)
*G01L 5/22* (2006.01)
(52) U.S. Cl.
CPC .............. *G01L 3/104* (2013.01); *G01L 5/221* (2013.01)

(58) Field of Classification Search
CPC ................................. G01L 3/104; G01L 5/221
See application file for complete search history.

(56) References Cited

U.S. PATENT DOCUMENTS

| | | | | |
|---|---|---|---|---|
| 7,174,795 B2 * | 2/2007 | Feng | ...................... | G01D 5/145 |
| | | | | 73/862.331 |
| 7,363,825 B2 * | 4/2008 | Feng | ...................... | G01L 3/104 |
| | | | | 73/862.325 |
| 8,448,528 B2 * | 5/2013 | McDonald | ............... | B62D 6/10 |
| | | | | 73/862.331 |
| 9,459,165 B2 * | 10/2016 | Hama | .................... | H02K 11/24 |
| 10,814,909 B2 * | 10/2020 | Yang | ........................ | G01B 7/06 |
| 10,948,369 B2 * | 3/2021 | Shigeta | .................... | B62D 6/10 |
| 11,112,321 B2 * | 9/2021 | Tanaka | ............... | G01R 33/0047 |

(Continued)

OTHER PUBLICATIONS

U.S. Appl. No. 18/410,071, filed Jan. 11, 2024, Uchida et al.
U.S. Appl. No. 18/410,224, filed Jan. 11, 2024, Okui.

*Primary Examiner* — Freddie Kirkland, III
(74) *Attorney, Agent, or Firm* — Posz Law Group, PLC

(57) ABSTRACT

A torque detection device includes a first yoke and a first magnetic guide member. A first opposing portion of the first magnetic guide member overlaps with a first-yoke ring of the first yoke when the first-yoke ring is projected onto the first opposing portion in an axial direction. Furthermore, the first opposing portion overlaps with an inner surface of a second tubular portion when the inner surface is projected onto the first opposing portion in the axial direction. A housing distance, which is a shortest distance measured from the first opposing portion to the inner surface, is longer than a yoke distance, which is a shortest distance measured from the first opposing portion to the first-yoke ring.

11 Claims, 25 Drawing Sheets

(56) References Cited

U.S. PATENT DOCUMENTS

| | | | |
|---|---|---|---|
| 11,353,521 B2 * | 6/2022 | Tanaka | G01R 33/0076 |
| 11,579,211 B2 * | 2/2023 | Tanaka | G01R 33/0076 |
| 2015/0276519 A1 | 10/2015 | Hama et al. | |
| 2020/0041366 A1 | 2/2020 | Tanaka et al. | |
| 2020/0386636 A1 * | 12/2020 | Shigeta | B62D 5/0481 |
| 2021/0109166 A1 | 4/2021 | Tanaka et al. | |
| 2022/0291297 A1 | 9/2022 | Tanaka et al. | |
| 2024/0142325 A1 * | 5/2024 | Uchida | G01L 3/109 |

* cited by examiner

TORQUE DETECTION DEVICE

CROSS REFERENCE TO RELATED APPLICATIONS

This application is a continuation application of International Patent Application No. PCT/JP2022/031610 filed on Aug. 22, 2022, which designated the U.S. and claims the benefit of priority from Japanese Patent Application No. 2021-136583 filed on Aug. 24, 2021. The entire disclosures of all of the above applications are incorporated herein by reference.

TECHNICAL FIELD

The present disclosure relates to a torque detection device.

BACKGROUND

Previously, there has been proposed a detection device that includes magnetic flux guide members, magnetic sensors, a case, a cap and a housing. The case receives the magnetic flux guide members and the magnetic sensors. An end portion of the case is inserted into the cap. An end portion of the cap is shaped in an oblong rectangular shape. Furthermore, a hole, which is formed at the housing, is shaped in an oblong rectangular shape that corresponds to the end portion of the cap. The end portion of the cap is inserted into the hole of the housing.

SUMMARY

This section provides a general summary of the disclosure, and is not a comprehensive disclosure of its full scope or all of its features.

According to the present disclosure, there is provided a torque detection device configured to detect a torque generated at a detection subject. The torque detection device includes a magnet, a rotor, a yoke, a magnetic detector, a guide member, a case and a housing. The yoke is configured to be rotated together with the rotor. The yoke has a ring and a plurality of claws. The plurality of claws project from the ring in an axial direction of the rotor and are thereby opposed to the magnet in a direction perpendicular to the axial direction. The magnetic detector is configured to detect a strength of a magnetic field generated from the magnet. The guide member is configured to guide the magnetic field to the magnetic detector. The case has a member support portion which is shaped in a bottomed tubular form and receives the magnetic detector. The member support portion covers the guide member and thereby supports the guide member. The housing has a first tubular portion and a second tubular portion. The first tubular portion is shaped in a tubular form and extends in the axial direction. The first tubular portion receives the magnet, the rotor and the yoke. The second tubular portion is shaped in a tubular form and extends in an extending direction of the second tubular portion that is perpendicular to the axial direction. The second tubular portion receives the member support portion. The guide member has an opposing portion. The opposing portion overlaps with the ring when the ring is projected onto the opposing portion in the axial direction, and the opposing portion overlaps with an inner surface of the second tubular portion when the inner surface of the second tubular portion is projected onto the opposing portion in the axial direction. A shortest distance measured from the opposing portion to the inner surface of the second tubular portion is longer than a shortest distance measured from the opposing portion to the ring.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
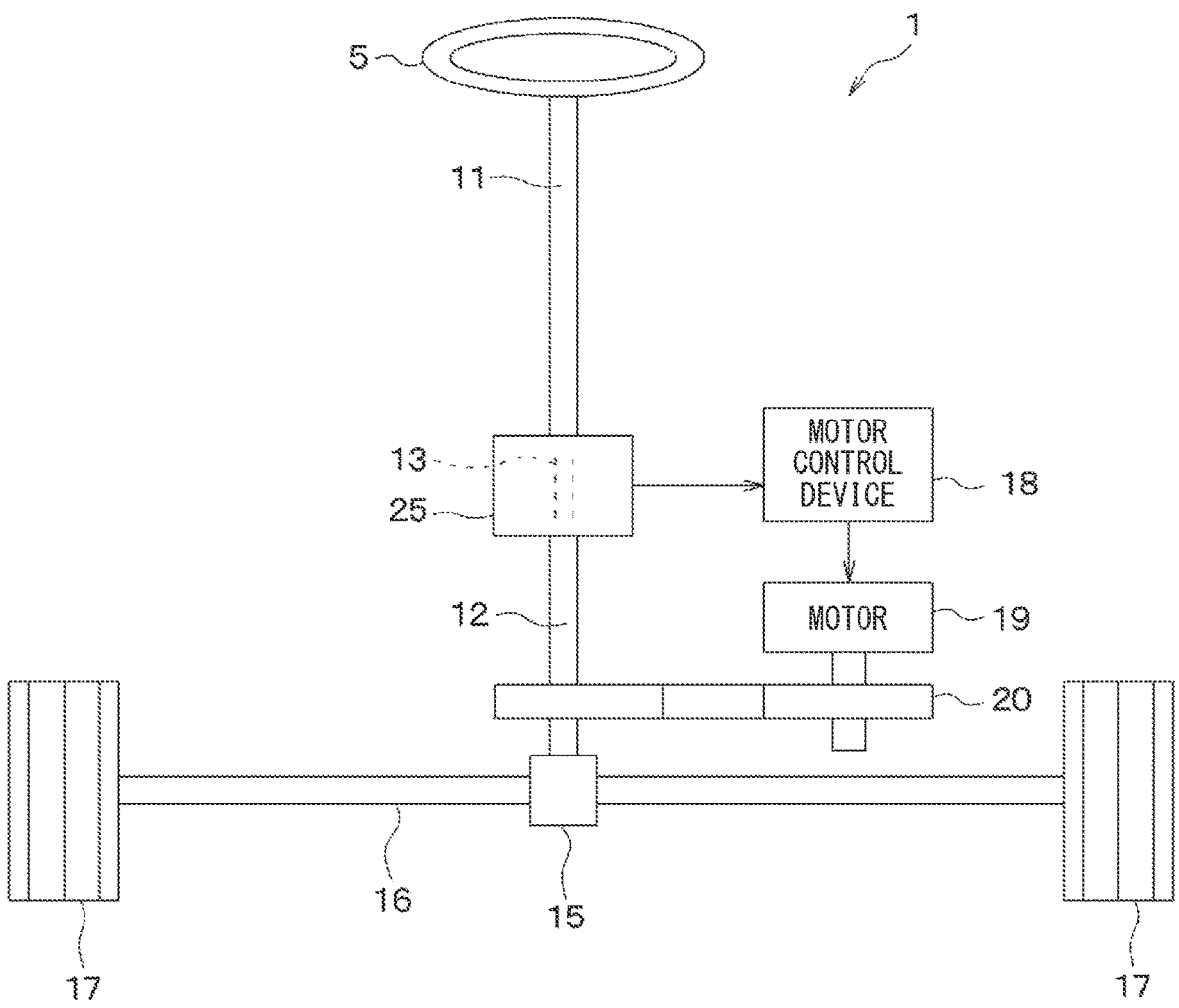
FIG. 1 is a diagram of a steering system in which a torque detection device of a first embodiment is applied.

Previously, there has been proposed a detection device that includes magnetic flux guide members, magnetic sensors, a case, a cap and a housing. The case receives the magnetic flux guide members and the magnetic sensors. An end portion of the case is inserted into the cap. An end portion of the cap is shaped in an oblong rectangular shape. Furthermore, a hole, which is formed at the housing, is shaped in an oblong rectangular shape that corresponds to the end portion of the cap. The end portion of the cap is inserted into the hole of the housing.

According to the study of the inventors of the present application, in the case of the detection device described above, since the hole of the housing and the end portion of the cap are each formed in the oblong rectangular shape, the cap is in close proximity to the housing. Thereby, since the end portion of the case, which is inserted into the cap, is in close proximity to the housing, the magnetic flux guide members and the magnetic sensors are in close proximity to the housing. Therefore, if static electricity is generated during a manufacturing process or a use process of the detection device, a discharge current, which is caused by this static electricity, is likely to flow to the housing through the magnetic flux guide members and the magnetic sensors. Therefore, in the detection device described above, a defect or a failure of the magnetic sensor may be more likely to occur, thereby deteriorating the ESD resistance. Here, ESD is an abbreviation for electrostatic discharge.

According to one aspect of the present disclosure, there is provided a torque detection device configured to detect a torque generated at a detection subject, including:

a magnet that is configured to generate a magnetic field and is configured to be rotated together with the detection subject;

a rotor that is configured to be rotated together with the detection subject;

a yoke that has:

a ring which is shaped in a ring form and is configured to be rotated together with the rotor; and a plurality of claws which project from the ring in an axial direction of the rotor and are thereby opposed to the magnet in a direction perpendicular to the axial direction, wherein the plurality of claws are configured to be rotated together with the ring and thereby change the magnetic field generated by the magnet;

a magnetic detector that is configured to detect a strength of the magnetic field while the strength of the magnetic field corresponds to the torque and changes in response to rotation of the plurality of claws;

a guide member that is configured to guide the magnetic field, which changes in response to the rotation of the plurality of claws, to the magnetic detector;

a case that has a member support portion which is shaped in a bottomed tubular form and receives the magnetic detector, wherein the member support portion covers the guide member and thereby supports the guide member; and a housing that has:

a first tubular portion which is shaped in a tubular form and extends in the axial direction, wherein the first tubular portion receives the magnet, the rotor and the yoke; and a second tubular portion which is shaped in a tubular form and extends in an extending direction of the second tubular portion that is perpendicular to the axial direction, wherein the second tubular portion receives the member support portion, wherein:

the guide member has an opposing portion, wherein the opposing portion overlaps with the ring when the ring is projected onto the opposing portion in the axial direction, and the opposing portion overlaps with an inner surface of the second tubular portion when the inner surface of the second tubular portion is projected onto the opposing portion in the axial direction; and a shortest distance measured from the opposing portion to the inner surface of the second tubular portion is longer than a shortest distance measured from the opposing portion to the ring.

Thereby, the magnetic detector and the guide member are farther spaced from the inner surface of the second tubular portion of the housing than the ring of the yoke. Therefore, even if the static electricity is generated during the manufacturing process or the use process of the torque detection device, the discharge current, which is caused by this static electricity, is less likely to flow to the housing through the magnetic detector and the guide member. Therefore, the ESD resistance is improved at the torque detection device.

Hereinafter, embodiments of the present disclosure will be described with reference to the drawings. In each of the following embodiments, portions, which are the same or equivalent to each other, will be indicated by the same reference signs.

First Embodiment

A torque detection device of the present embodiment is used in, for example, a steering system 1 installed in a vehicle. First of all, this steering system 1 will be described.

Figure 2:
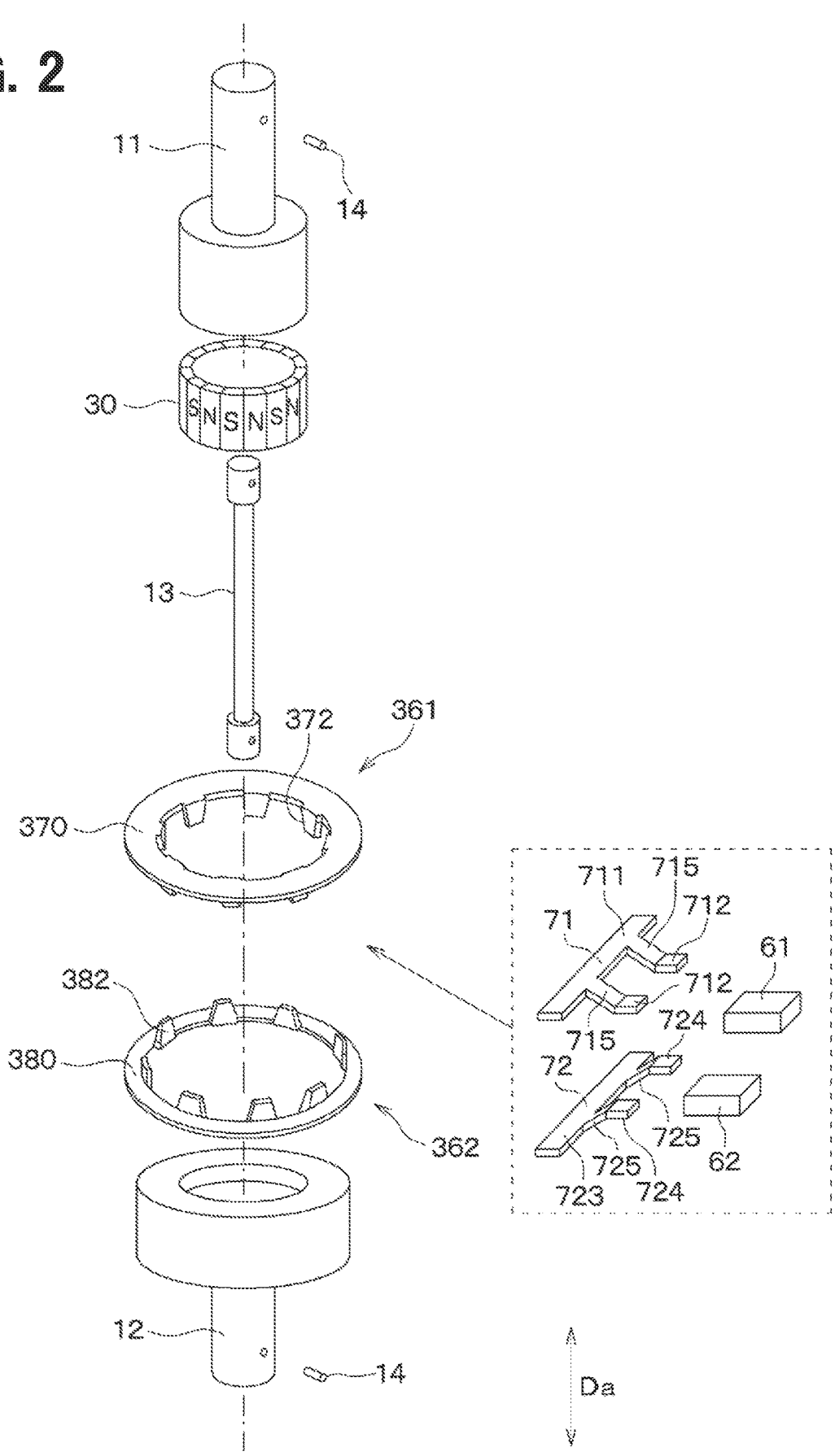
FIG. 2 is an exploded perspective view of a portion of the steering system.

The steering system 1 assists a steering operation for changing the orientation of wheels 17 of the vehicle. Specifically, as shown in FIGS. 1 and 2, the steering system 1 includes a steering wheel 5, a first steering shaft 11, a torsion bar 13 and a second steering shaft 12. Furthermore, the steering system 1 includes shaft pins 14, a pinion gear 15, a rack shaft 16, the wheels 17, a torque sensor 25, a motor control device 18, an electric motor 19 and reduction gears 20.

As shown in FIG. 1, the steering wheel 5 is rotated through the steering operation of the steering wheel 5 by a driver of the vehicle or an automated driving of the vehicle.

The first steering shaft 11 is coupled to the steering wheel 5. Therefore, the first steering shaft 11 is rotated together with the steering wheel 5.

The torsion bar 13 is coupled to the first steering shaft 11. Therefore, the torsion bar 13 is rotated together with the steering wheel 5 and the first steering shaft 11.

The second steering shaft 12 is coupled to the torsion bar 13. Therefore, the torsion bar 13 is rotated together with the steering wheel 5, the first steering shaft 11 and the second steering shaft 12.

As shown in FIG. 2, one of the shaft pins 14 is inserted into a hole of the first steering shaft 11 and a hole of the torsion bar 13 which correspond with each other. Thereby, the first steering shaft 11 and the torsion bar 13 are fixed together. Furthermore, another one of the shaft pins 14 is inserted into a hole of the second steering shaft 12 and another hole of the torsion bar 13 which correspond each other. Thereby, the second steering shaft 12 and the torsion bar 13 are fixed together.

As shown in FIG. 1, the pinion gear 15 is coupled to the second steering shaft 12. Furthermore, the pinion gear 15 is meshed with the rack shaft 16 described later. In addition, the pinion gear 15 converts the rotational motion of the second steering shaft 12 into linear motion of the rack shaft 16.

The rack shaft 16 is coupled to the wheels 17 through tie rods (not shown). The rack shaft 16 changes the orientation of the wheels 17 through the linear motion.

A portion of the torsion bar 13 is inserted into the torque sensor 25. Furthermore, the torque sensor 25 serves as a torque detection device and detects a signal that corresponds to the torsional torque generated at the torsion bar 13 through the rotation of the steering wheel 5. Thereby, the torque sensor 25 detects the steering torque. Furthermore, the torque sensor 25 outputs the signal, which corresponds to the detected steering torque, to the motor control device 18. The torque sensor 25 will be described in detail later. The steering torque is the torque that is exerted when the steering wheel 5 is rotated.

The motor control device 18 includes a microcomputer as its main component and includes a CPU, a ROM, a flash memory, a RAM, an I/O device, a drive circuit, and bus lines connecting these components. The motor control device 18 executes a program(s) stored in the ROM. Thereby, the motor control device 18 calculates a rotational angle of the electric motor 19 described later. Furthermore, the motor control device 18 calculates the steering torque based on the signal, which corresponds to the steering torque and is outputted from the torque sensor 25. The motor control device 18 controls the rotation of the electric motor 19 based on the calculated rotational angle of the electric motor 19 and the calculated steering torque.

The electric motor 19 is rotated based on the output from the motor control device 18. Thereby, the electric motor 19 generates the torque.

The reduction gears 20 are coupled to the electric motor 19 and the second steering shaft 12. Furthermore, the reduction gears 20 reduce the rotational speed of the rotation outputted from the electric motor 19 and transmit the torque of the rotation generated by the electric motor 19 to the second steering shaft 12. Therefore, the steering operation, which changes the orientation of the wheels 17, is assisted.

The steering system 1 is configured as described above. Next, the structure of the torque sensor 25 will be described.

As shown in FIGS. 2 to 9, the torque sensor 25 includes a magnet 30, a rotor 35, a first yoke 361, a second yoke 362, a fixation collar 354 and a housing 40. The torque sensor 25 further includes a circuit board 60, a first magnetic detector 61, a second magnetic detector 62, a first magnetic guide member 71, a second magnetic guide member 72, a sensor case 75, an elastic member 80, a plurality of terminals 85 and a terminal case 90.

As shown in FIG. 2, the magnet 30 is shaped in a circular ring form. Furthermore, the magnet 30 is coupled to an end portion of the first steering shaft 11. A portion of the torsion bar 13 is inserted into a hole of the magnet 30. An axis of the magnet 30 is coaxial with an axis of the torsion bar 13. Therefore, the magnet 30 is rotated together with the first steering shaft 11 about the axis of the torsion bar 13. Furthermore, the magnet 30 is magnetized such that magnetic poles are arranged in the rotational direction of the magnet 30 such that polarities of the magnetic poles are alternately reversed in the rotational direction of the magnet 30.

Figure 3:
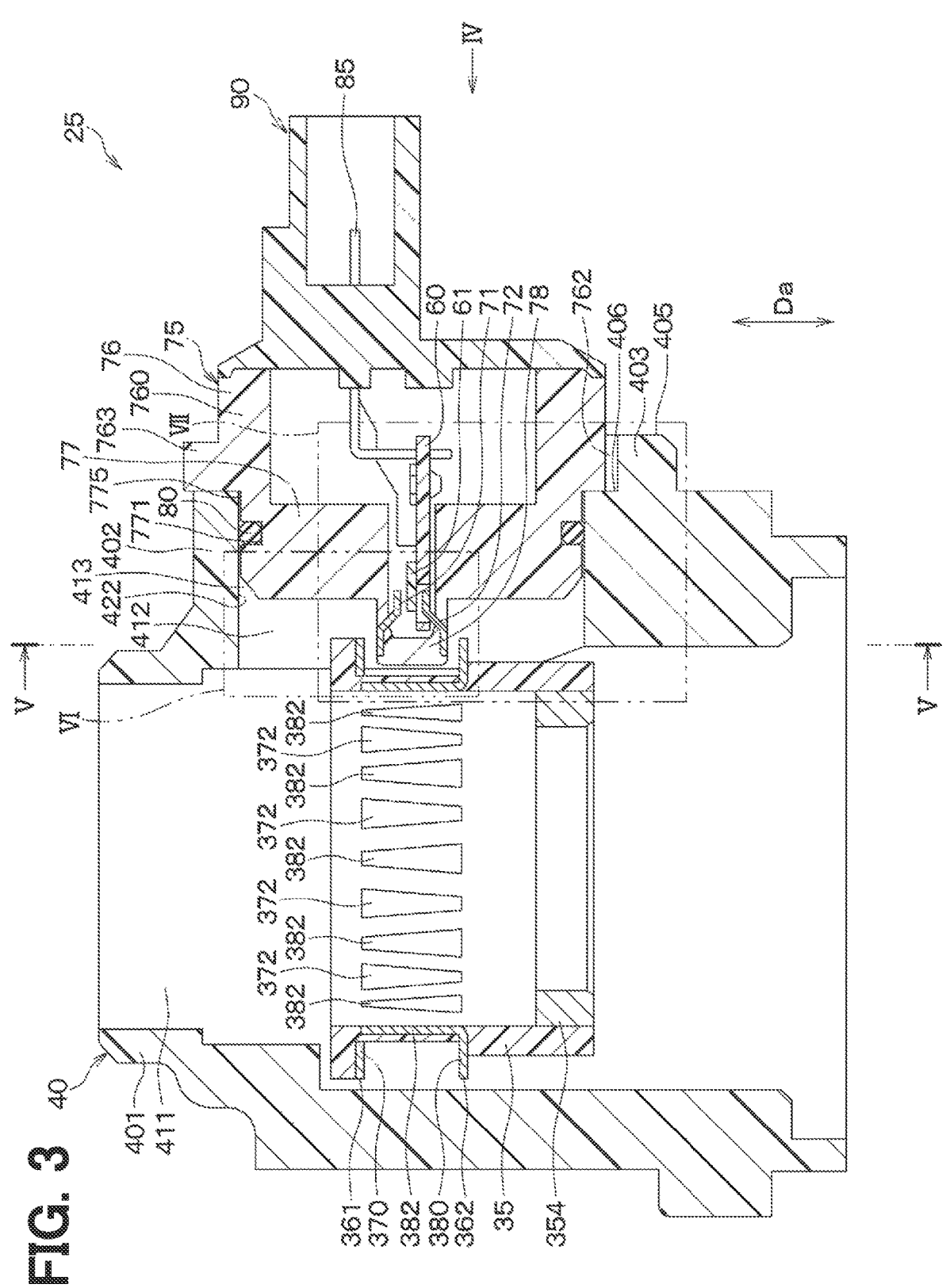
FIG. 3 is a cross-sectional view of the torque detection device.

As shown in FIG. 3, the rotor 35 is shaped in a cylindrical tubular form. An axis of the rotor 35 is coaxial with the axis of the magnet 30. Therefore, the axis of the rotor 35, the axis of the magnet 30 and the axis of the torsion bar 13 are coaxial to each other.

Hereafter, for the sake of convenience, a radial direction of the rotor 35 will be simply referred to as a radial direction. Furthermore, an axial direction Da of the rotor 35 will be simply referred to as an axial direction Da. Also, a circumferential direction about the axis of the rotor 35 will be simply referred to as a circumferential direction.

As shown in FIGS. 2 and 3, the first yoke 361 is shaped in a tubular form and is made of a soft magnetic material. The first yoke 361 has a first-yoke ring 370 and a plurality of first-yoke claws 372.

The first-yoke ring 370 is shaped in a circular ring form. Furthermore, a plurality of portions of the first-yoke ring 370 are inserted into a plurality of corresponding holes of the rotor 35 each of which extends in the radial direction.

The first-yoke claws 372 project from an inner periphery of the first-yoke ring 370 in the axial direction Da. Furthermore, each of the first-yoke claws 372 is shaped in a tapered form that is tapered from the inner periphery of the first-yoke ring 370 toward a distal end side of the first-yoke claw 372. Furthermore, each of the first-yoke claws 372 is in contact with and is connected to an inner peripheral surface of the rotor 35. Also, the first-yoke claws 372 are opposed to an outer peripheral surface of the magnet 30 in the radial direction. Furthermore, the plurality of corresponding holes of the rotor 35 are arranged at equal intervals in the circumferential direction, so that the first-yoke claws 372 are also arranged at predetermined intervals in the circumferential direction.

Like the first yoke 361, the second yoke 362 is shaped in a ring form and is made of a soft magnetic material. Furthermore, the second yoke 362 is, for example, integrally molded together with the rotor 35 and the first yoke 361. Furthermore, the second yoke 362 has a second-yoke ring 380 and a plurality of second-yoke claws 382.

The second-yoke ring 380 is shaped in a circular ring form. Furthermore, a plurality of portions of the second-yoke ring 380 are inserted into a plurality of corresponding holes of the rotor 35 each of which extends in the radial direction.

The second-yoke claws 382 project from an inner periphery of the second-yoke ring 380 in the axial direction Da. Furthermore, each of the second-yoke claws 382 is shaped in a tapered form that is tapered from the inner periphery of the second-yoke ring 380 toward a distal end side of the second-yoke claw 382. Furthermore, each of the second-yoke claws 382 is in contact with and is connected to the inner peripheral surface of the rotor 35. Also, the second-yoke claws 382 are opposed to the outer peripheral surface of the magnet 30 in the radial direction. Furthermore, the plurality of corresponding holes of the rotor 35 are arranged at equal intervals in the circumferential direction, so that the second-yoke claws 382 are also arranged at predetermined intervals in the circumferential direction. Furthermore, each of the second-yoke claws 382 is placed between corresponding adjacent two of the first-yoke claws 372. Therefore, the first-yoke claws 372 and the second-yoke claws 382 are alternately arranged in the circumferential direction.

The fixation collar 354 is shaped in a tubular form. The fixation collar 354 is coupled to the inner surface of the rotor 35. Furthermore, the fixation collar 354 is coupled to the second steering shaft 12. Therefore, the rotor 35 is rotated together with the second steering shaft 12.

Figure 4:
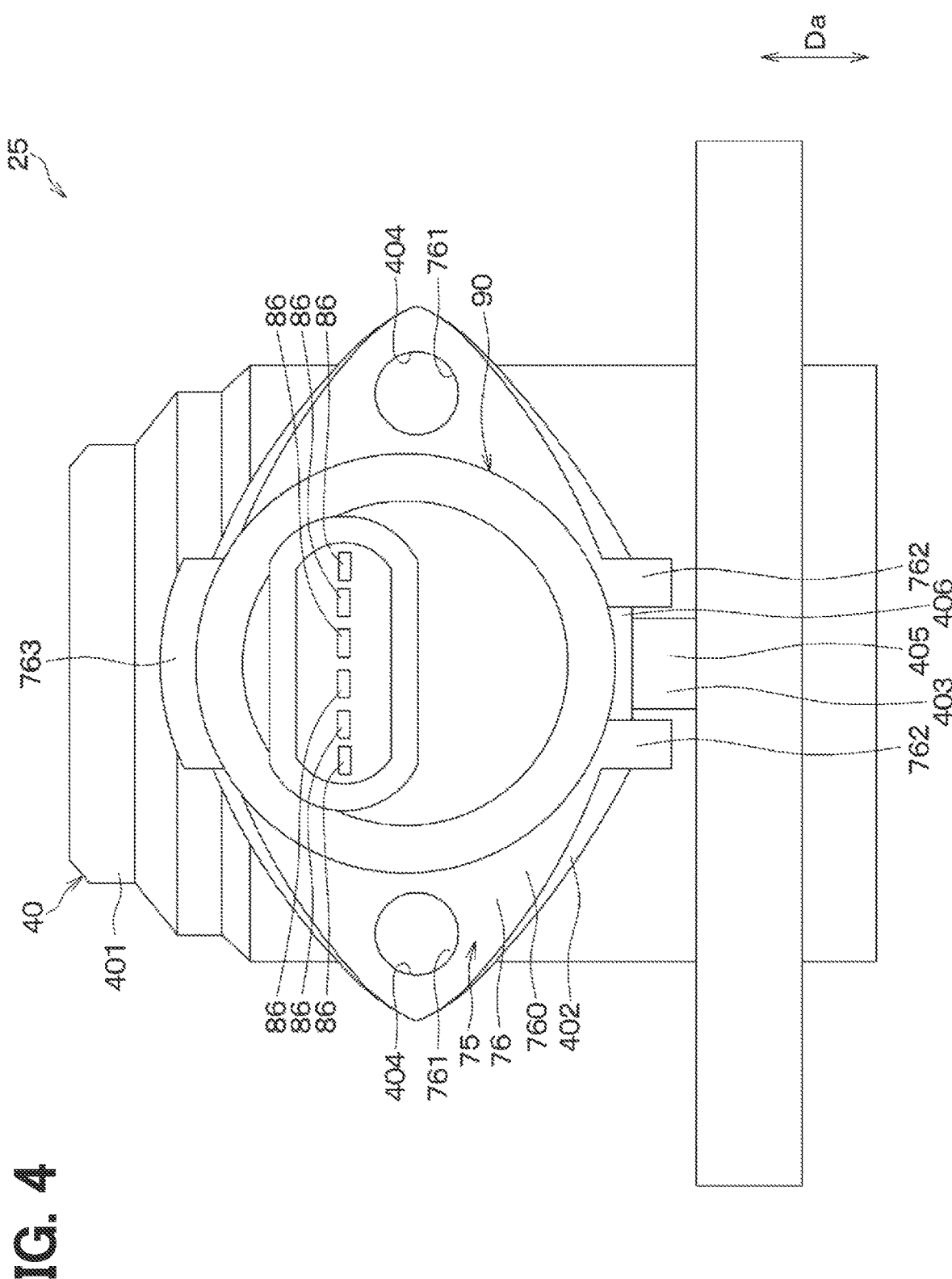
FIG. 4 is a view in a direction of an arrow IV in FIG. 3.
Figure 5:
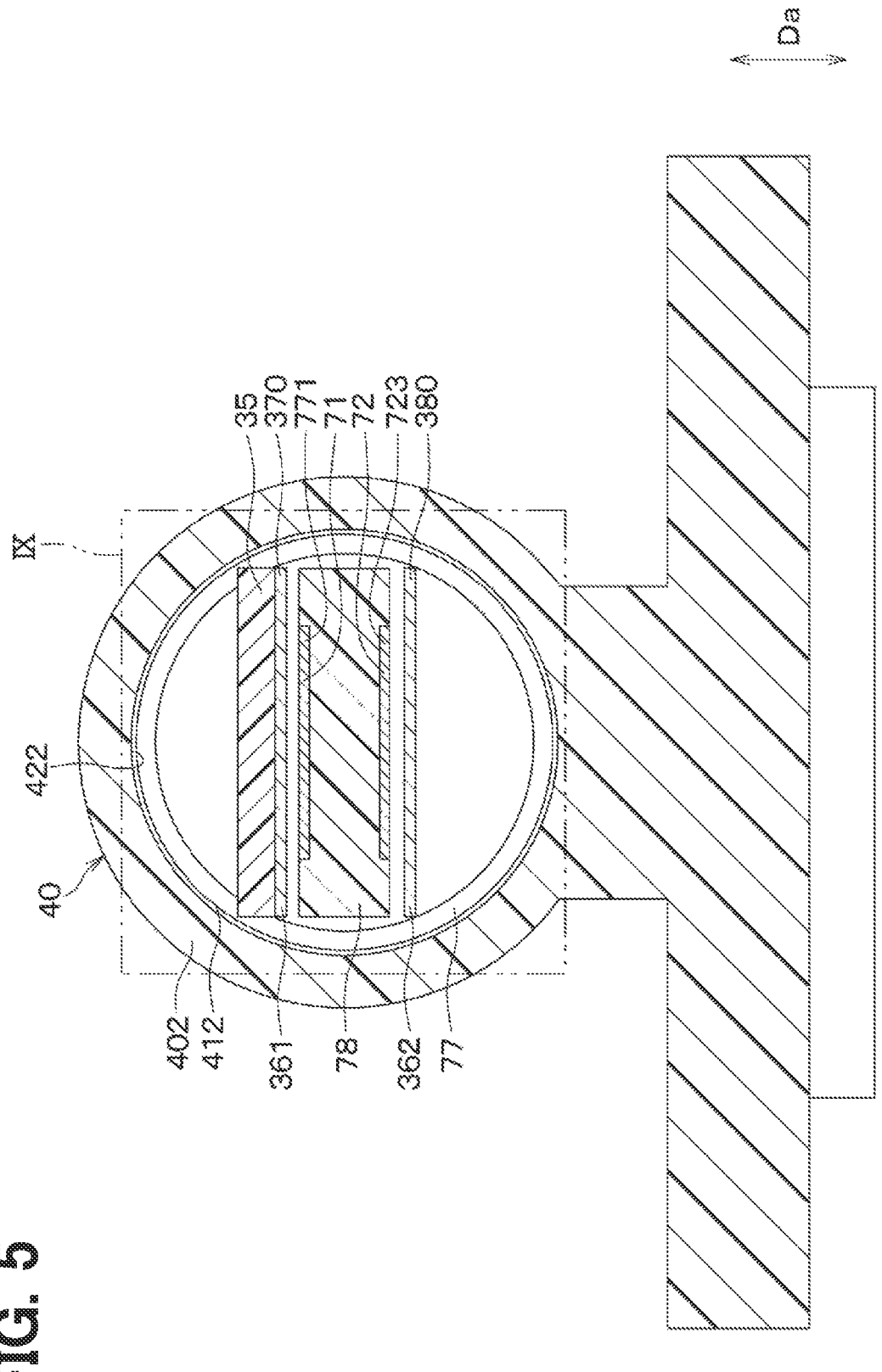
FIG. 5 is a cross-sectional view taken along line V-V in FIG. 3.

As shown in FIGS. 3 to 5, the housing 40 includes a first tubular portion 401 and a second tubular portion 402.

The first tubular portion 401 is shaped in a tubular form and extends in the axial direction Da. The first tubular portion 401 has a first space 411. The rotor 35, the first yoke 361, the second yoke 362 and the fixation collar 354 are received in the first space 411.

The second tubular portion 402 is shaped in a tubular form and extends in the radial direction. Furthermore, the second tubular portion 402 is joined to the first tubular portion 401 in the radial direction. The second tubular portion 402 has a second space 412, a third space 413, a housing protrusion 403 and a plurality of housing holes 404. The second space 412 is communicated with the first space 411. When the second tubular portion 402 is cut in the axial direction Da, a cross-section of the second space 412 is shaped in a circular form. The third space 413 is communicated with the second space 412. When the second tubular portion 402 is cut in the axial direction Da, a cross-section of the third space 413 has a circular shape. The housing protrusion 403 outwardly protrudes in the radial direction from an end surface 406 of the second tubular portion 402 which is located on a side of the second tubular portion 402 opposite to the first tubular portion 401. The housing holes 404 are holes that are used to fix the second tubular portion 402 with the sensor case 75 described later.

The circuit board 60 is a printed circuit board. The first magnetic detector 61 is installed to the circuit board 60. The first magnetic detector 61 includes, for example, a Hall element or an MR element (not shown). By using the Hall element or the MR element, the first magnetic detector 61 detects a strength of the magnetic field exerted to the first magnetic detector 61 in the axial direction Da. Furthermore, the first magnetic detector 61 outputs a signal, which corresponds to the detected strength of the magnetic field, to the motor control device 18. The second magnetic detector 62 is installed to the circuit board 60. The second magnetic detector 62 includes, for example, a Hall element or an MR element (not shown). Like the first magnetic detector 61, by using the Hall element or the MR element, the second magnetic detector 62 detects the strength of the magnetic field exerted to the second magnetic detector 62 in the axial direction Da. Furthermore, the second magnetic detector 62 outputs a signal, which corresponds to the detected strength of the magnetic field, to the motor control device 18. Here, MR stands for magneto resistive.

The first magnetic guide member 71 is made of a soft magnetic material. Furthermore, as shown in FIGS. 2, 3 and 5 to 7, the first magnetic guide member 71 has a first opposing portion 711, first intermediate portions 715 and second opposing portions 712. The first opposing portion 711 is opposed to the first-yoke ring 370 in the axial direction Da. Furthermore, the first opposing portion 711 overlaps with the first-yoke ring 370 when the first-yoke ring 370 is projected onto the first opposing portion 711 in the axial direction Da. The first opposing portion 711 is shaped in a plate form that extends in the radial direction. The first intermediate portions 715 are joined to the first opposing portion 711. Furthermore, each of the first intermediate portions 715 is shaped in a plate form that extends in a direction which intersect the axial direction Da and the radial direction. Each of the second opposing portions 712 is joined to a part of the corresponding first intermediate portion 715 which is opposite to the first opposing portion 711. Furthermore, the second opposing portions 712 are respectively opposed to the first magnetic detector 61 and the second magnetic detector 62 in the axial direction Da.

The second magnetic guide member 72 is made of a soft magnetic material. Furthermore, the second magnetic guide member 72 has a third opposing portion 723, second intermediate portions 725 and fourth opposing portions 724. The third opposing portion 723 is opposed to the second-yoke ring 380 in the axial direction Da. Furthermore, the third opposing portion 723 overlaps with the second-yoke ring 380 when the second-yoke ring 380 is projected onto the third opposing portion 723 in the axial direction Da. The third opposing portion 723 is shaped in a plate form that extends in the radial direction. The second intermediate portions 725 are joined to the third opposing portion 723. Furthermore, each of the second intermediate portions 725 is shaped in a plate form that extends in the direction which intersects the axial direction Da and the radial direction. Each of the fourth opposing portions 724 is joined to a part of the corresponding second intermediate portion 725 which is opposite to the third opposing portion 723. Furthermore, the fourth opposing portions 724 are inserted into a hole of the circuit board 60. Therefore, the fourth opposing portions 724 are respectively opposed to the first magnetic detector 61 and the second magnetic detector 62 in the axial direction Da.

The sensor case 75 is made of, for example, resin. As shown in FIGS. 3 to 8, the sensor case 75 has a flange 76, an insert portion 77 and a member support portion 78.

The flange 76 has a flange tubular portion 760, flange holes 761, rotation limiting flange protrusions 762 and a positioning flange protrusion 763. The flange tubular portion 760 is shaped in a tubular form (rhombic tubular form) that has a rhombic shape and extends in a direction perpendicular to the axial direction Da, and thereby the flange tubular portion 760 receives a portion of the circuit board 60 and portions of the terminals 85 described later. Furthermore, the flange tubular portion 760 is opposed to the end surface 406 of the second tubular portion 402 in the radial direction. The flange holes 761 are formed at the flange tubular portion 760 and correspond to the housing holes 404. The sensor case 75 and the housing 40 are fixed together by inserting a screw or a bolt (not shown) into each of the flange holes 761 and a corresponding one of the housing holes 404.

The number of the rotation limiting flange protrusions 762 is two, and these two rotation limiting flange protrusions 762 protrude from the flange tubular portion 760 in the axial direction Da. The housing protrusion 403 is located between the two rotation limiting flange protrusions 762.

The positioning flange protrusion 763 protrudes in the axial direction Da from an opposite part of the flange tubular portion 760 which is opposite to the two rotation limiting flange protrusions 762.

The insert portion 77 is joined to the flange 76 in the radial direction and is inserted into the third space 413 of the second tubular portion 402. The insert portion 77 is shaped in a cylindrical tubular form and thereby receives a portion of the circuit board 60 and a portion of the first magnetic detector 61. The insert portion 77 has a recess 771. The elastic member 80, which will be described later, is inserted into a space which is formed by the recess 771. An end of the insert portion 77 is opposed to an end of the rotor 35, an end of the first-yoke ring 370 and an end of the second-yoke ring 380 in an extending direction of the second tubular portion 402, in which the second tubular portion 402 extends. Therefore, in the extending direction of the second tubular portion 402, a space is formed between: the end of the insert portion 77; and the end of the rotor 35, the end of the first-yoke ring 370 and the end of the second-yoke ring 380.

The member support portion 78 is joined in the radial direction to a part of the insert portion 77 which is opposite to the flange 76. The member support portion 78 is inserted into the second space 412 of the second tubular portion 402. The member support portion 78 is shaped in a bottomed tubular form that has a rectangular shape, so that the member support portion 78 receives a portion of the circuit board 60 and a portion of the first magnetic detector 61. The member support portion 78 covers the first opposing portion 711 of the first magnetic guide member 71 and exposes a surface of the first opposing portion 711 which is opposed to the first-yoke ring 370. Furthermore, the member support portion 78 covers a portion of each of the first intermediate portions 715 of the first magnetic guide member 71. Thereby, the member support portion 78 supports the first magnetic guide member 71. Furthermore, the member support portion 78 covers the third opposing portion 723 of the second magnetic guide member 72 and exposes a surface of the third opposing portion 723 which is opposed to the second-yoke ring 380. Also, the member support portion 78 covers a part of each of the second intermediate portions 725 of the second magnetic guide member 72. Thereby, the member support portion 78 supports the second magnetic guide member 72.

The elastic member 80 is made of, for example, rubber and is, for example, an O-ring or an X-ring. The elastic member 80 is inserted into the space which is formed by the recess 771. Furthermore, the elastic member 80 is clamped between the recess 771 and the inner surface 422 of the second tubular portion 402 and is thereby elastically deformed. Thereby, the elastic member 80 seals a gap between the inner surface 422 of the second tubular portion 402 and an opposing surface 775 of the insert portion 77 opposed to the inner surface 422. Therefore, intrusion of foreign objects (e.g., dust, water) into the first space 411 and the second space 412 of the housing 40 is limited, and thereby, for example, the first magnetic detector 61 and second magnetic detector 62 are protected from the foreign objects. Thus, the dustproof and waterproof properties of the torque sensor 25 are improved.

A portion of each of the terminals 85 is inserted into a corresponding one of holes of the circuit board 60. Furthermore, the terminals 85 are soldered to the circuit board 60 and are thereby connected to the circuit board 60. Furthermore, the terminals 85 are connected to the motor control device 18. Thus, the signals from the first magnetic detector 61 and the second magnetic detector 62 are outputted to the motor control device 18 through the terminals 85.

The terminal case 90 is shaped in a tubular form and is made of, for example, resin. Furthermore, the terminal case 90 receives portions of the terminals 85. Furthermore, the portions of the terminals 85 are respectively inserted into holes of the terminal case 90, so that the terminal case 90 supports the portions of the terminals 85. Also, a portion of the terminal case 90 is inserted into the space formed at the inside of the flange 76 and the insert portion 77. Furthermore, a part of this portion of the terminal case 90 is inserted into a hole of the circuit board 60, and thereby the terminal case 90 and the circuit board 60 are fixed each other.

Figure 6:
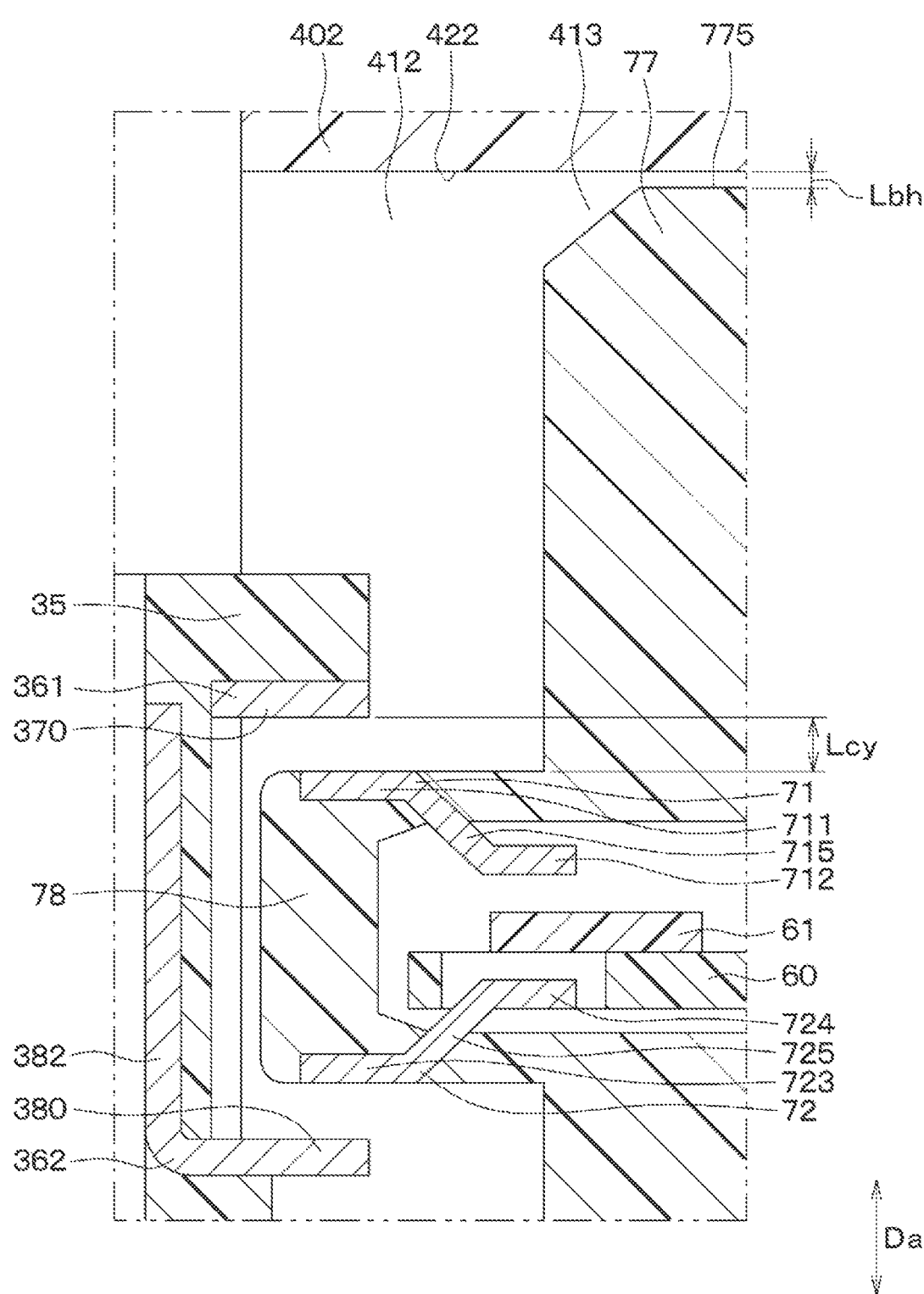
FIG. 6 is an enlarged view of a section VI of FIG. 3.
Figure 9:
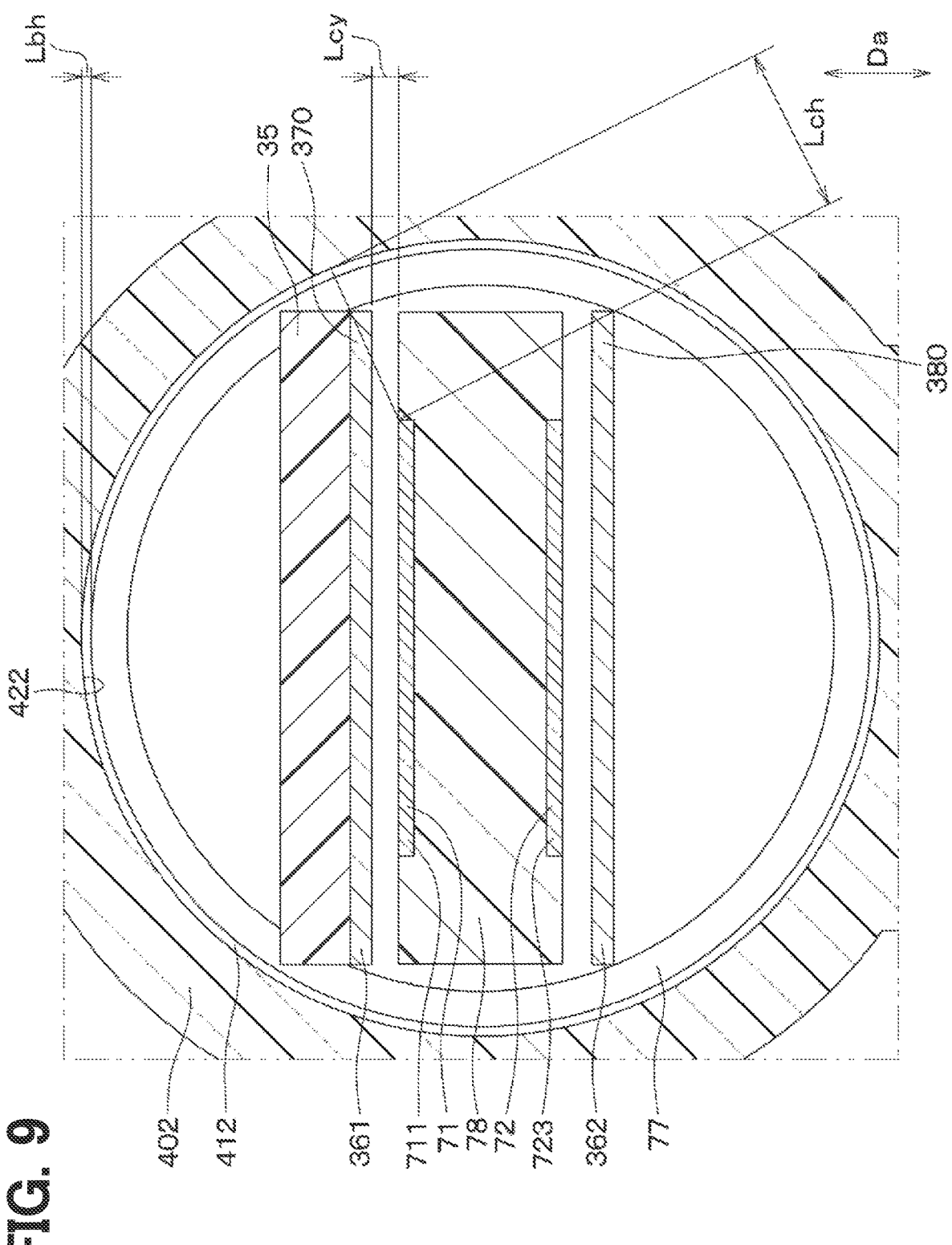
FIG. 9 is an enlarged view of a section IX of FIG. 5.

Here, as shown in FIGS. 6 and 9, a shortest distance, which is measured from the first opposing portion 711 of the first magnetic guide member 71 to the first-yoke ring 370, is defined as a yoke distance Lcy. A shortest distance, which is measured from the first opposing portion 711 to the inner surface 422 of the second tubular portion 402 of the housing 40, is defined as a housing distance Lch. As shown in the following relational equation (1), the housing distance Lch is longer than the yoke distance Lcy. Furthermore, the shortest distance measured from the third opposing portion 723 of the second magnetic guide member 72 to the inner surface 422 is longer than the shortest distance measured from the third opposing portion 723 to the second-yoke ring 380. The yoke distance Lcy may possibly be the shortest distance measured in the axial direction Da from the first opposing portion 711 of the first magnetic guide member 71 to the first-yoke ring 370. Also, the housing distance Lch may possibly be the shortest distance measured in the axial direction Da from the first opposing portion 711 to the inner surface 422 of the second tubular portion 402 of the housing 40.

$$Lch > Lcy \tag{1}$$

A shortest distance, which is measured from the inner surface 422 of the second tubular portion 402 to the opposing surface 775 of the insert portion 77, is defined as a gap distance Lbh. As shown in the following relational equation (2), the yoke distance Lcy is longer than the gap distance Lbh. Furthermore, the shortest distance measured from the third opposing portion 723 of the second magnetic guide member 72 to the second-yoke ring 380 is longer than the gap distance Lbh. Here, the gap distance Lbh may possibly be the shortest distance measured in the axial direction Da from the inner surface 422 of the second tubular portion 402 to the opposing surface 775 of the insert portion 77.

$$Lbh < Lcy \tag{2}$$

Figure 7:
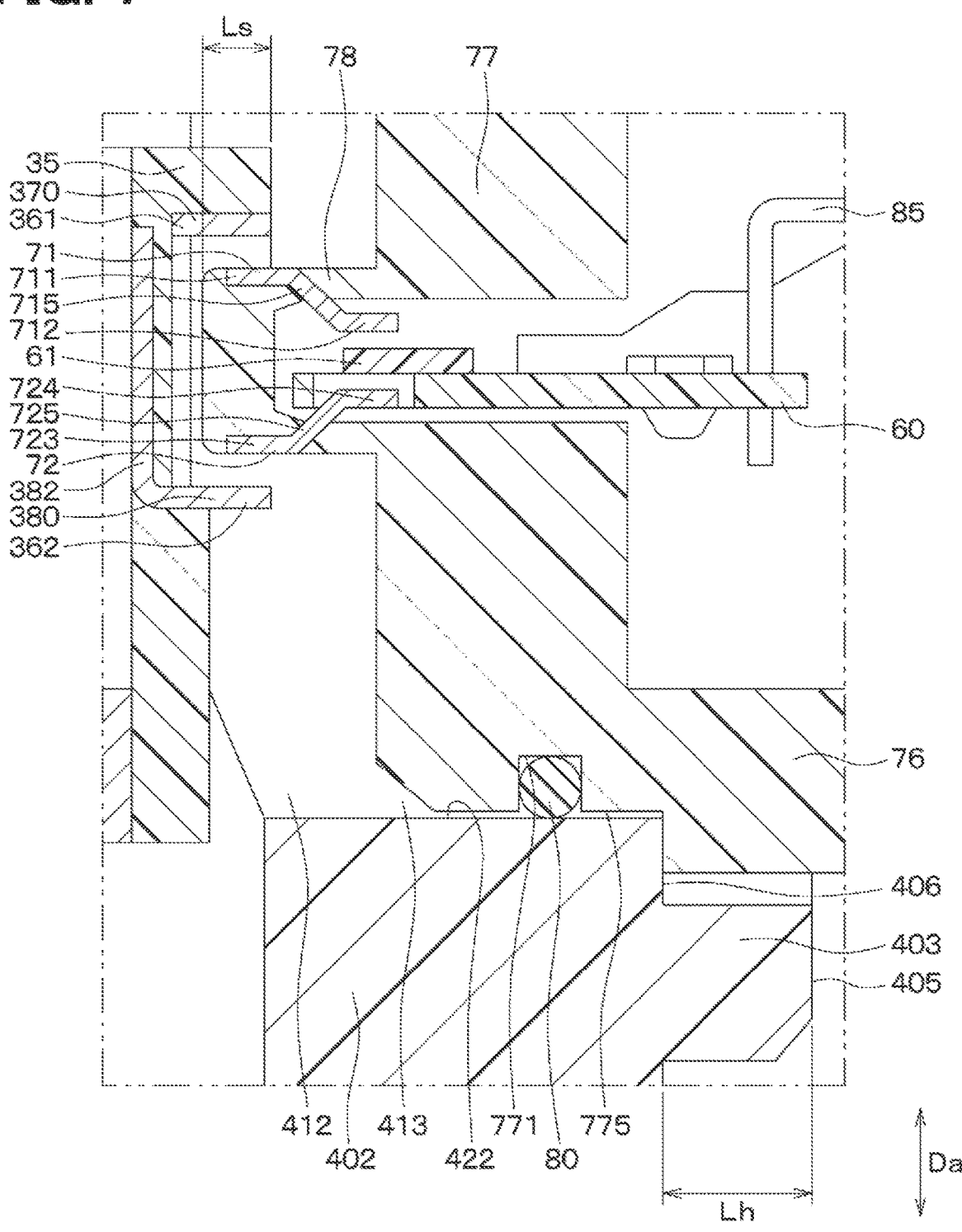
FIG. 7 is an enlarged view of a section VII of FIG. 3.
Figure 8:
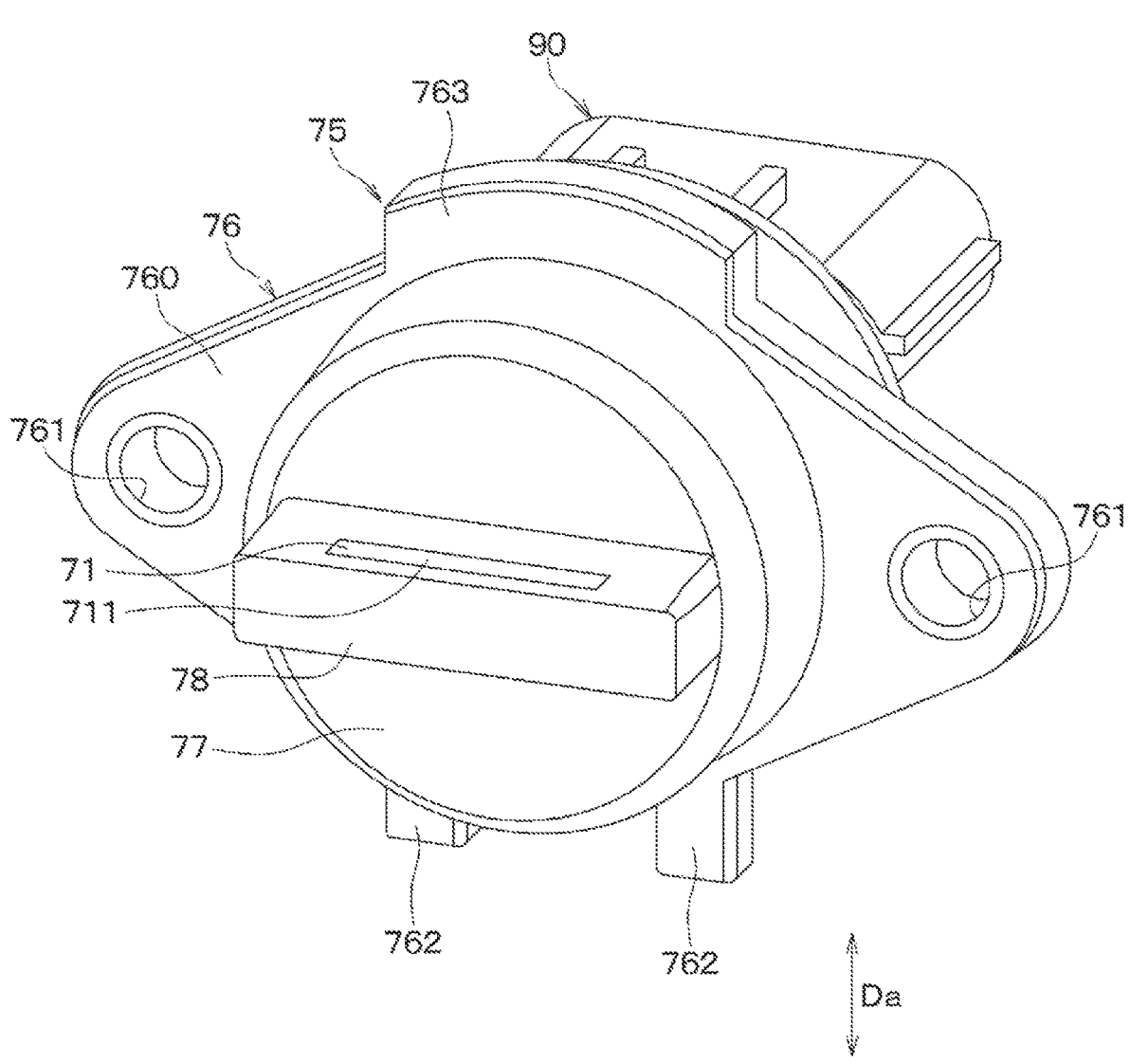
FIG. 8 is a perspective view of a sensor case and a terminal case of the torque detection device.

Furthermore, with reference to FIG. 7, an overlapping section between the member support portion 78 and the first-yoke ring 370 is formed when the first-yoke ring 370 is projected onto the member support portion 78 in the axial direction Da, and a length of this overlapping section between the member support portion 78 and the first-yoke ring 370 measured in the extending direction of the second tubular portion 402 is defined as an overlap length Ls. A length of the housing protrusion 403, which is measured from the end surface 406 of the second tubular portion 402 to a distal end surface 405 of the housing protrusion 403 in the extending direction of the second tubular portion 402, is defined as a protrusion length Lh. As shown in the following relational equation (3), the protrusion length Lh is longer than the overlap length Ls. Furthermore, the protrusion length Lh is longer than a length of an overlapping section between the member support portion 78 and the second-yoke ring 380 measured in the extending direction of the second tubular portion 402, and this overlapping section between the member support portion 78 and the second-yoke ring 380 is formed when the second-yoke ring 380 is projected onto the member support portion 78 in the axial direction Da.

$$Lh > Ls \tag{3}$$

The torque sensor 25 is configured in the above-described manner. Next, the detection of the steering torque with the torque sensor 25 will be described.

Figure 10:
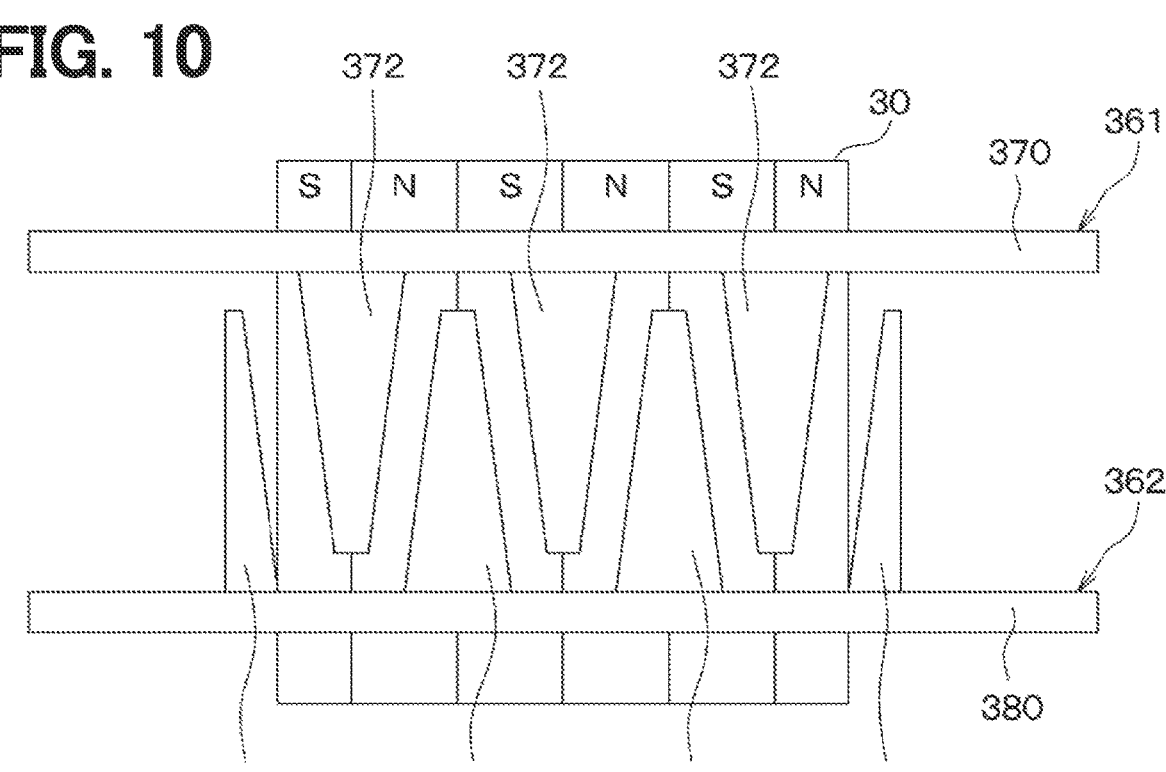
FIG. 10 is a side view showing a neutral state of a magnet, a first yoke and a second yoke of a torque sensor.

It is assumed that no steering torque is generated by the steering wheel 5 when the steering wheel 5 is not rotated. In this case, as shown in FIG. 10, a phase of the magnet 30, the first-yoke claws 372 and the second-yoke claws 382 is held in a neutral state in the circumferential direction. In this neutral state, a center of each first-yoke claw 372 and a center of each second-yoke claw 382 coincide with a boundary between the corresponding N-pole and the corresponding S-pole of the magnet 30 in the circumferential direction. At this time, the number of magnetic field lines, which extend from the N-pole of the magnet 30 and pass through the first-yoke claw 372, is the same as the number of magnetic field lines, which extend from the N-pole of the magnet 30 and pass through the second-yoke claw 382. Therefore, a magnetic flux density is not generated between the first yoke 361 and the second yoke 362.

Then, when the steering wheel 5 is rotated, the steering torque is generated. Thereby, the first steering shaft 11, which is coupled to the steering wheel 5, is rotated. Furthermore, the torsion bar 13, which is fixed to the first steering shaft 11 by the shaft pin 14, is rotated. Also, the second steering shaft 12, which is fixed to the torsion bar 13 by the shaft pin 14, is rotated. Furthermore, the second steering shaft 12 is coupled to the fixation collar 354. Therefore, the rotor 35 is rotated. Thereby, the first yoke 361 and the second yoke 362, which are integrally formed with the rotor 35, are rotated relative to the magnet 30.

Figure 11:
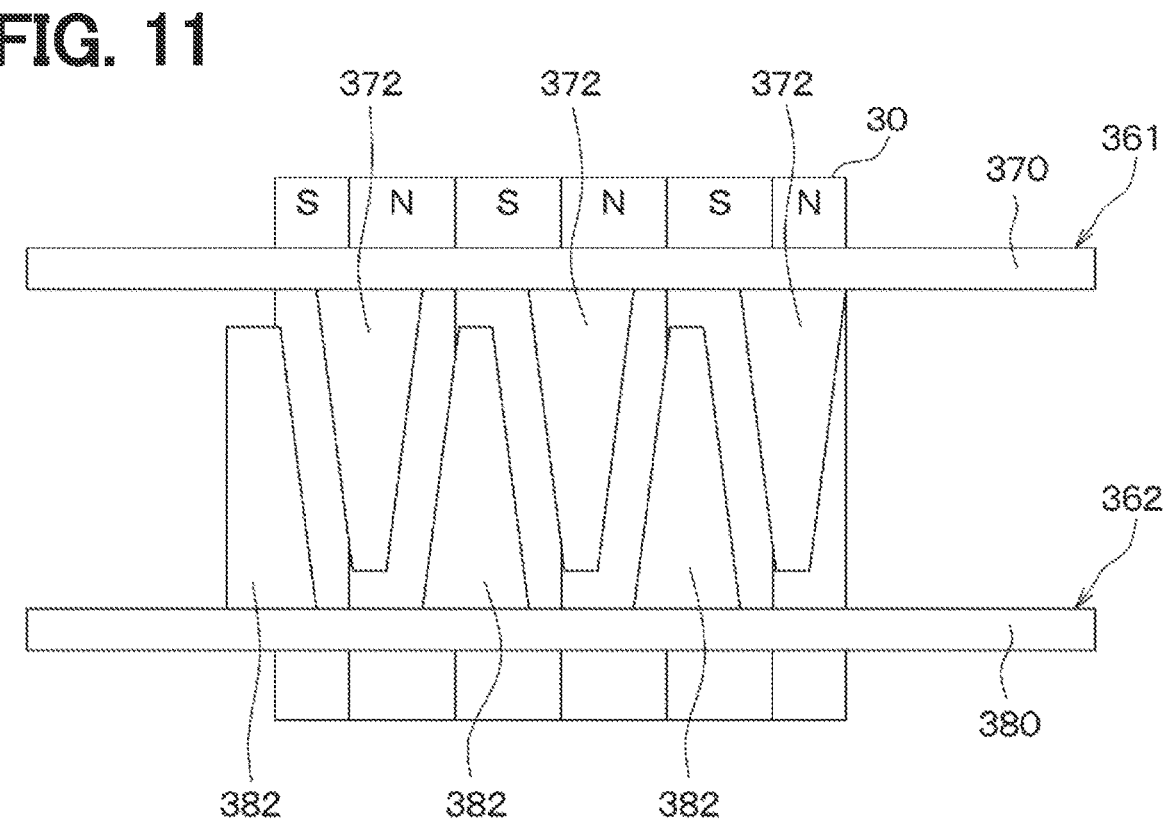
FIG. 11 is a side view of the magnet, the first yoke and the second yoke of the torque sensor when a steering wheel of the steering system is rotated.

In this case, as shown in FIG. 11, an overlapping area between the N-pole of the magnet 30 and the first-yoke claw 372 in the direction perpendicular to the axial direction Da is increased. Furthermore, an overlapping area between the S-pole of the magnet 30 and the second-yoke claw 382 in the direction perpendicular to the axial direction Da is increased. At this time, the number of magnetic field lines, which extend from the N-pole of the magnet 30 to the first-yoke claw 372, is increased, and the number of magnetic field lines, which extend from the second-yoke claw 382 to the S-pole of the magnet 30, is increased. Therefore, the magnetic flux density is generated between the first yoke 361 and the second yoke 362.

Here, as described above, the first magnetic guide member 71 is made of the soft magnetic material and is opposed to the first-yoke ring 370 and the first magnetic detector 61 in the axial direction Da. Furthermore, as described above, the second magnetic guide member 72 is made of the soft magnetic material and is opposed to the first magnetic detector 61 and the second-yoke ring 380 in the axial direction Da.

Therefore, at this time, the number of magnetic field lines, which extend from the N-pole of the magnet 30 and pass through the first magnetic detector 61 via the first-yoke ring 370 and the first magnetic guide member 71, is increased. Furthermore, the magnetic field lines, which have passed through the first magnetic detector 61, pass through the S-pole of the magnet 30 via the second magnetic guide member 72 and the second-yoke ring 380.

Thus, the first magnetic detector 61 detects the strength of the magnetic field directed toward one side among two opposite sides in the axial direction Da. Thereby, the first magnetic detector 61 detects the steering torque. Furthermore, the first magnetic detector 61 outputs the signal, which corresponds to the detected strength of the magnetic field, to the motor control device 18 through the corresponding terminal 85. The motor control device 18 calculates the steering torque based on the signal outputted from the first magnetic detector 61.

Figure 12:
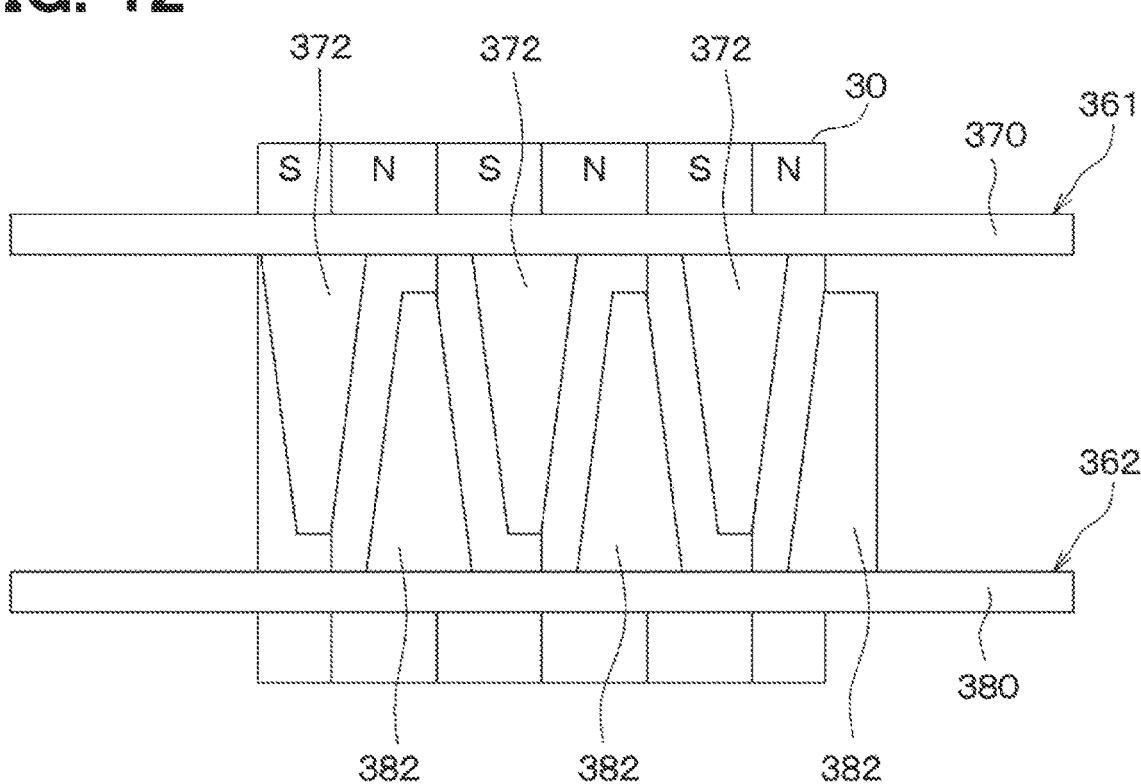
FIG. 12 is a side view of the magnet, the first yoke and the second yoke of the torque sensor when the steering wheel is further rotated.

In a case where the steering torque is generated in an opposite direction, which is opposite to the direction of the steering torque in the case of FIG. 11, as shown in FIG. 12, an overlapping area between the S-pole of the magnet 30 and the first-yoke claw 372 in the direction perpendicular to the axial direction Da is increased. Furthermore, an overlapping area between the N-pole of the magnet 30 and the second-yoke claw 382 in the direction perpendicular to the axial direction Da is increased. At this time, the number of magnetic field lines, which extend from the N-pole of the magnet 30 to the second-yoke claw 382, is increased, and the number of magnetic field lines, which extend from the first-yoke claw 372 to the S-pole of the magnet 30, is increased. Therefore, the magnetic flux density is generated between the first yoke 361 and the second yoke 362.

Therefore, at this time, the number of magnetic field lines, which extend from the N-pole of the magnet 30 and pass through the first magnetic detector 61 via the second-yoke ring 380 and the second magnetic guide member 72, is increased. Furthermore, the magnetic field lines, which have passed through the first magnetic detector 61, pass through the S-pole of the magnet 30 via the first magnetic guide member 71 and the first-yoke ring 370.

Thus, the first magnetic detector 61 detects the strength of the magnetic field directed toward the other side among the two opposite sides in the axial direction Da. Thereby, the first magnetic detector 61 detects the steering torque. Furthermore, the first magnetic detector 61 outputs a signal, which corresponds to the detected strength of the magnetic field, to the motor control device 18 through the corresponding terminal 85. The motor control device 18 calculates the steering torque based on the signal outputted from the first magnetic detector 61.

As described above, the torque sensor 25 detects the steering torque. Furthermore, the second magnetic detector 62 of the torque sensor 25 detects the steering torque like the first magnetic detector 61. Therefore, if the first magnetic detector 61 fails, the torque sensor 25 can detect the steering torque by using the second magnetic detector 62. Next, there will be described the improvement of the ESD resistance at the torque sensor 25. Here, ESD is the abbreviation for electrostatic discharge.

The torque sensor 25 includes the magnet 30, the rotor 35, the first yoke 361, the second yoke 362, the first magnetic detector 61, the second magnetic detector 62, the first magnetic guide member 71, the second magnetic guide member 72, the sensor case 75 and the housing 40. The magnet 30 is configured to generate the magnetic field and is configured to be rotated together with the steering wheel 5. The first yoke 361 has the first-yoke ring 370 and the first-yoke claws 372. The first-yoke ring 370 is shaped in the ring form and is configured to be rotated together with the rotor 35. The first-yoke claws 372 project from the first-yoke ring 370 in the axial direction Da and are thereby opposed to the magnet 30 in the radial direction. The first-yoke claws 372 are configured to be rotated together with the first-yoke ring 370 and thereby change the magnetic field generated by the magnet 30. The second yoke 362 has the second-yoke ring 380 and the second-yoke claws 382. The second-yoke ring 380 is shaped in the ring form and is configured to be rotated together with the rotor 35. The second-yoke claws 382 project from the second-yoke ring 380 in the axial direction Da and are thereby opposed to the magnet 30 in the radial direction. The second-yoke claws 382 are configured to be rotated together with the second-yoke ring 380 and thereby change the magnetic field generated by the magnet 30. Each of the first magnetic detector 61 and the second magnetic detector 62 is configured to detect the strength of the magnetic field while the strength of the magnetic field changes in response to the rotation of first-yoke claws 372 and the second-yoke claws 382. This strength of the magnetic field corresponds to the steering torque. The first magnetic guide member 71 is configured to guide the magnetic field, which changes in response to the rotation of the first-yoke claws 372, to the first magnetic detector 61 and the second magnetic detector 62. The second magnetic guide member 72 is configured to guide the magnetic field, which changes in response to the rotation of the second-yoke claws 382, to the first magnetic detector 61 and the second magnetic detector 62. The sensor case 75 has the member support portion 78. The member support portion 78 is shaped in the bottomed tubular form and receives the first magnetic detector 61 and the second magnetic detector 62. The member support portion 78 covers the first magnetic guide member 71 and the second magnetic guide member 72 and thereby supports the first magnetic guide member 71 and the second magnetic guide member 72. The housing 40 has the first tubular portion 401 and the second tubular portion 402. The first tubular portion 401 is shaped in the tubular form and extends in the axial direction Da. The first tubular portion 401 receives the magnet 30, the rotor 35, the first yoke 361 and the second yoke 362. The second tubular portion 402 is shaped in the tubular form and extends in the radial direction. The second tubular portion 402 receives the member support portion 78. Furthermore, the first magnetic guide member 71 has the first opposing portion 711. The first opposing portion 711 overlaps with the first-yoke ring 370 when the first-yoke ring 370 is projected onto the first opposing portion 711 in the axial direction Da. The first opposing portion 711 overlaps with the inner surface 422 of the second tubular portion 402 when the inner surface 422 of the second tubular portion 402 is projected onto the first opposing portion 711 in the axial direction Da. The second magnetic guide member 72 has the third opposing portion 723. The third opposing portion 723 overlaps with the second-yoke ring 380 when the second-yoke ring 380 is projected onto the third opposing portion 723 in the axial direction Da. The third opposing portion 723 overlaps with the inner surface 422 of the second tubular portion 402 when the inner surface 422 of the second tubular portion 402 is projected onto the third opposing portion 723 in the axial direction Da. As shown in FIGS. 6 and 9, the housing distance Lch is longer than the yoke distance Lcy. Furthermore, the shortest distance measured from the third opposing portion 723 to the inner surface 422 is longer than the shortest distance measured from the third opposing portion 723 of the second magnetic guide member 72 to the second-yoke ring 380. The steering wheel 5 serves as a detection subject (detection subject device). The steering torque serves as the torque of the detection subject. The first yoke 361 and the second yoke 362 each serve as a yoke. The first-yoke ring 370 and the second-yoke ring 380 each serve as a ring. The first-yoke claws 372 and the second-yoke claws 382 each serve as a plurality of claws. The first magnetic detector 61 and the second magnetic detector 62 each serve as a magnetic detector. The first magnetic guide member 71 and the second magnetic guide member 72 each serve as a guide member. The first opposing portion 711 and the third opposing portion 723 each serve as an opposing portion. The sensor case 75 serves as a case. The radial direction serves as a direction perpendicular to the axial direction Da.

Thereby, the first magnetic detector 61, the second magnetic detector 62 and the first magnetic guide member 71 are farther spaced from the inner surface 422 of the second tubular portion 402 of the housing 40 than the first-yoke ring 370. Therefore, even if the static electricity is generated during a manufacturing process or a use process of the torque sensor 25, the discharge current, which is caused by this static electricity, is less likely to flow to the housing 40 through the first magnetic detector 61, the second magnetic detector 62 and the first magnetic guide member 71. Therefore, the ESD resistance is improved at the torque sensor 25. Furthermore, the first magnetic detector 61, the second magnetic detector 62 and the second magnetic guide member 72 are farther spaced from the inner surface 422 of the second tubular portion 402 of the housing 40 than the second-yoke ring 380. Therefore, even if the static electricity is generated during the manufacturing process or the use process of the torque sensor 25, the discharge current, which is caused by this static electricity, is less likely to flow to the housing 40 through the first magnetic detector 61, the second magnetic detector 62 and the second magnetic guide member 72. Therefore, the ESD resistance is improved at the torque sensor 25.

Furthermore, the torque sensor 25 achieves the following advantages.

[1-1] The sensor case 75 has the insert portion 77. The insert portion 77 is joined to the member support portion 78 in the extending direction of the second tubular portion 402 and is inserted into the second tubular portion 402. Furthermore, the yoke distance Lcy is longer than the gap distance Lbh. Furthermore, the shortest distance measured from the third opposing portion 723 of the second magnetic guide member 72 to the second-yoke ring 380 is longer than the gap distance Lbh.

Thereby, even if the member support portion 78 is displaced in the axial direction Da, the inner surface 422 of the second tubular portion 402 and the opposing surface 775 of the insert portion 77 come into contact each other before the first opposing portion 711 and the first-yoke ring 370 come into contact each other. Thus, interference between the first opposing portion 711 and the first-yoke ring 370 is limited. Furthermore, even if the member support portion 78 is displaced in the axial direction Da, the inner surface 422 of the second tubular portion 402 and the opposing surface 775 of the insert portion 77 come into contact each other before the third opposing portion 723 and the second-yoke ring 380 come into contact each other. Thus, interference between the third opposing portion 723 and the second-yoke ring 380 is limited. This also reduces the risk of failure or other problems of the torque sensor 25, the first yoke 361 and the second yoke 362.

[1-2] The sensor case 75 has the flange 76. The flange 76 is joined to the opposite part of the insert portion 77, which is opposite to the member support portion 78, in the extending direction of the second tubular portion 402. The second tubular portion 402 has the end surface 406 and the housing protrusion 403. The end surface 406 is located on the side of the second tubular portion 402 which is opposite to the first tubular portion 401, and the end surface 406 faces in the extending direction of the second tubular portion 402. The housing protrusion 403 protrudes from the end surface 406 in the extending direction of the second tubular portion 402. The flange 76 has the flange tubular portion 760 and the two rotation limiting flange protrusions 762. The flange tubular portion 760 is shaped in the tubular form and is opposed to the end surface 406 of the second tubular portion 402 in the extending direction of the second tubular portion 402. The two rotation limiting flange protrusions 762 protrude from the flange tubular portion 760 in the axial direction Da. The housing protrusion 403 is located between the two rotation limiting flange protrusions 762 and thereby limits rotation of the sensor case 75 about the axis, which extends in the extending direction of the second tubular portion 402, when the housing protrusion 403 contacts one of the two rotation limiting flange protrusion 762.

Since the rotation of the sensor case 75 is limited, the relative distance between the first opposing portion 711 of the first magnetic guide member 71 and the first-yoke ring 370 and the relative distance between the third opposing portion 723 of the second magnetic guide member 72 and the second-yoke ring 380 remain constant. Therefore, the sensitivity of the first magnetic detector 61 and the sensitivity of the second magnetic detector 62 can be stabilized.

[1-3] As shown in FIG. 7, the protrusion length Lh is longer than the overlap length Ls. Furthermore, the protrusion length Lh is longer than the length of the overlapping section between the member support portion 78 and the second-yoke ring 380 measured in the extending direction of the second tubular portion 402, and this overlapping section between the member support portion 78 and the second-yoke ring 380 is formed when the second-yoke ring 380 is projected onto the member support portion 78 in the axial direction Da.

Therefore, even if the member support portion 78 is displaced in the extending direction of the second tubular portion 402, the flange tubular portion 760 and the end surface 406 of the second tubular portion 402 come into contact each other before the member support portion 78 and the rotor 35 come into contact each other. Thus, interference between the member support portion 78 and the rotor 35 is limited.

[1-4] The flange 76 has the positioning flange protrusion 763. The positioning flange protrusion 763 protrudes in the axial direction Da from the opposite part of the flange tubular portion 760 which is opposite to the two rotation limiting flange protrusions 762. The positioning flange protrusion 763 serves as a protrusion.

As a result, when the flange tubular portion 760 is installed to the second tubular portion 402 in a state where the flange tubular portion 760 is erroneously displaced from its proper orientation by 180 degrees in the circumferential direction of the flange tubular portion 760, the positioning flange protrusion 763 contacts the housing protrusion 403. Therefore, at this time, the insert portion 77 cannot be inserted into the third space 413 of the second tubular portion 402. Thus, since the error in the orientation of the flange tubular portion 760 is limited, it is possible to limit occurrence of reversal of positive/negative of the signal of the first magnetic detector 61 and the second magnetic detector 62 caused by the change in the orientation of the first magnetic detector 61 and the second magnetic detector 62.

Second Embodiment

Figure 13:
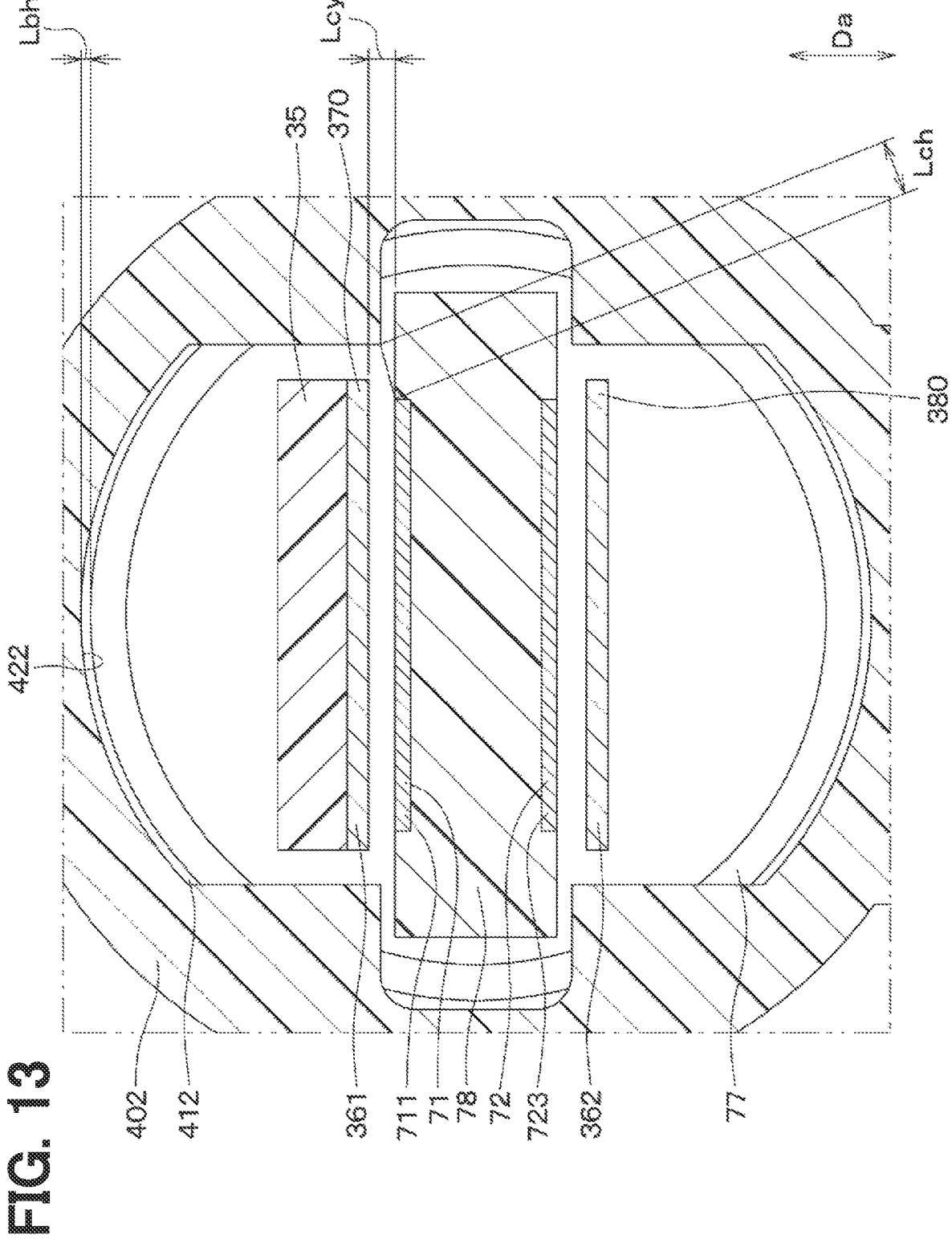
FIG. 13 is a cross-sectional view of a torque sensor of a second embodiment.

In a second embodiment, the shape of the second space 412 of the second tubular portion 402 of the housing 40 is different from that of the first embodiment. The rest of the configuration of the second embodiment is the same as that of the first embodiment. As shown in FIG. 13, when the second tubular portion 402 is cut in the axial direction Da, a cross-section of the second space 412 has a criss-cross shape. A distance measured in the axial direction Da between two opposite parts of the inner surface 422 of the second tubular portion 402 is equal to or longer than a distance measured in the direction perpendicular to the axial direction Da between two opposite parts of the inner surface 422 of the second tubular portion 402. Furthermore, a shortest distance measured in the axial direction Da from an end of the member support portion 78 to the inner surface 422 of the second tubular portion 402 is shorter than the yoke distance Lcy. The second embodiment is configured in the above-described manner. Even in the second embodiment, the advantages, which are similar to those of the first embodiment, are achieved.

Third Embodiment

Figure 14:
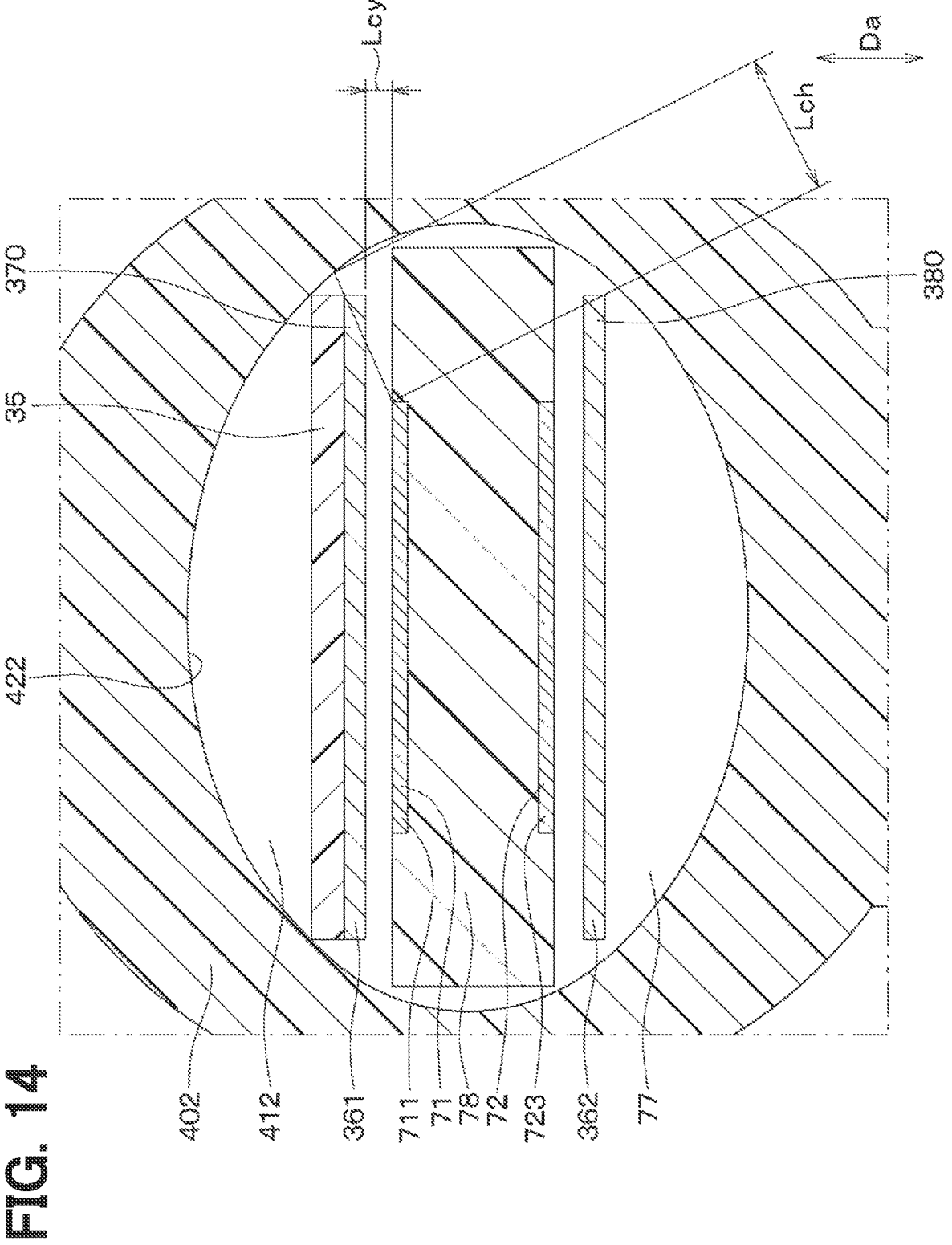
FIG. 14 is a cross-sectional view of a torque sensor of a third embodiment.

In a third embodiment, the shape of the second space 412 is different from that of the first embodiment. The rest of the configuration of the third embodiment is the same as that of the first embodiment. As shown in FIG. 14, when the second tubular portion 402 is cut in the axial direction Da, a cross-section of the second space 412 has an elliptical shape. A distance measured in the axial direction Da between two opposite parts of the inner surface 422 of the second tubular portion 402 is shorter than a distance measured in the direction perpendicular to the axial direction Da between two opposite parts of the inner surface 422 of the second tubular portion 402. Furthermore, a shortest distance measured in the axial direction Da from the end of the member support portion 78 to the inner surface 422 of the second tubular portion 402 is shorter than the yoke distance Lcy. The third embodiment is configured in the above-described manner. Even in the third embodiment, the advantages, which are similar to those of the first embodiment, are achieved.

Fourth Embodiment

Figure 15:
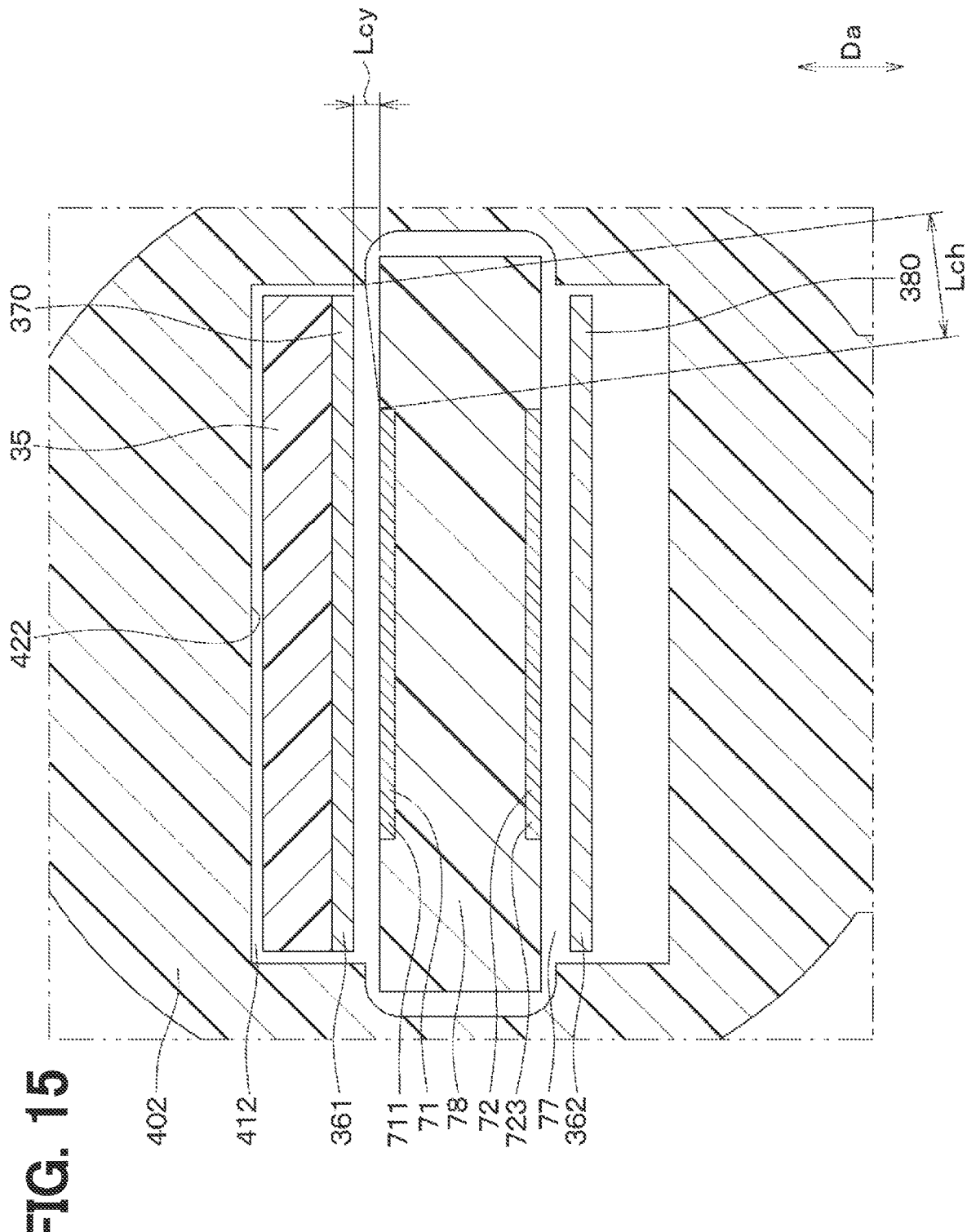
FIG. 15 is a cross-sectional view of a torque sensor of a fourth embodiment.

In a fourth embodiment, the shape of the second space 412 is different from that of the first embodiment. The rest of the configuration of the fourth embodiment is the same as that of the first embodiment. As shown in FIG. 15, when the second tubular portion 402 is cut in the axial direction Da, a cross-section of the second space 412 has a criss-cross shape. A distance measured in the axial direction Da between two opposite parts of the inner surface 422 of the second tubular portion 402 is shorter than a distance measured in the direction perpendicular to the axial direction Da between two opposite parts of the inner surface 422 of the second tubular portion 402. Furthermore, a shortest distance measured in the axial direction Da from the end of the member support portion 78 to the inner surface 422 of the second tubular portion 402 is shorter than the yoke distance Lcy. The fourth embodiment is configured in the above-described manner. Even in the fourth embodiment, the advantages, which are similar to those of the first embodiment, are achieved.

Fifth Embodiment

In a fifth embodiment, the shape of the second tubular portion 402 and the shape of the insert portion 77 of the sensor case 75 are different from those of the first embodiment. The rest of the configuration of the fifth embodiment is the same as that of the first embodiment.

Figure 16:
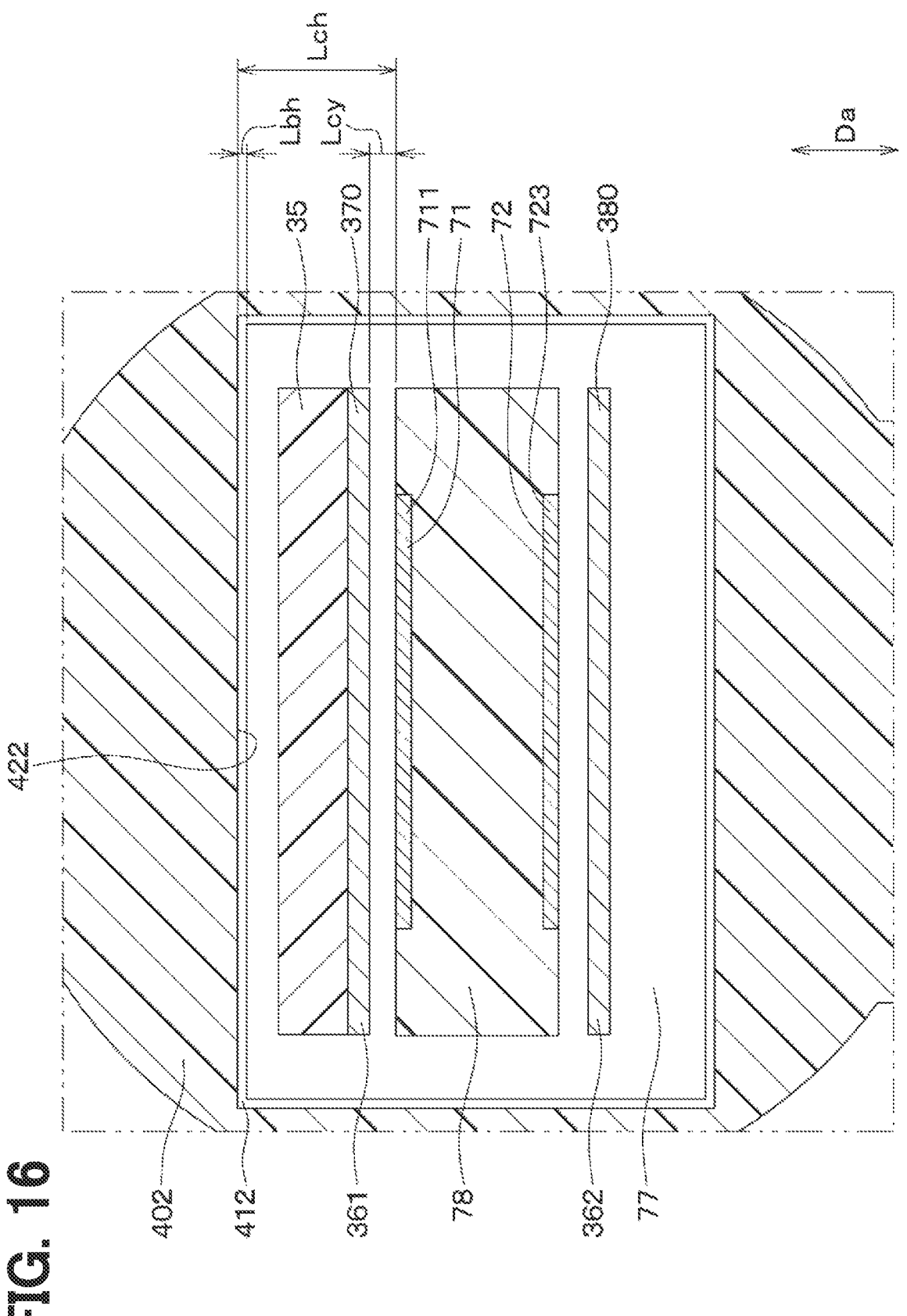
FIG. 16 is a cross-sectional view of a torque sensor of a fifth embodiment.

As shown in FIG. 16, when the second tubular portion 402 is cut in the axial direction Da, a cross-section of the second space 412 of the second tubular portion 402 has an oblong rectangular shape. A distance measured in the axial direction Da between two opposite parts of the inner surface 422 of the second tubular portion 402 is shorter than a distance measured in the direction perpendicular to the axial direction Da between two opposite parts of the inner surface 422 of the second tubular portion 402. Furthermore, when the second tubular portion 402 is cut in the axial direction Da, a cross-section of the third space 413 of the second tubular portion 402 has an oblong rectangular shape. Here, it should be noted that the shape of the cross-section of the third space 413 is not limited to the oblong rectangular shape when the second tubular portion 402 is cut in the axial direction Da. The shape of the cross-section of the third space 413 may be a polygonal shape when the second tubular portion 402 is cut in the axial direction Da.

Figure 17:
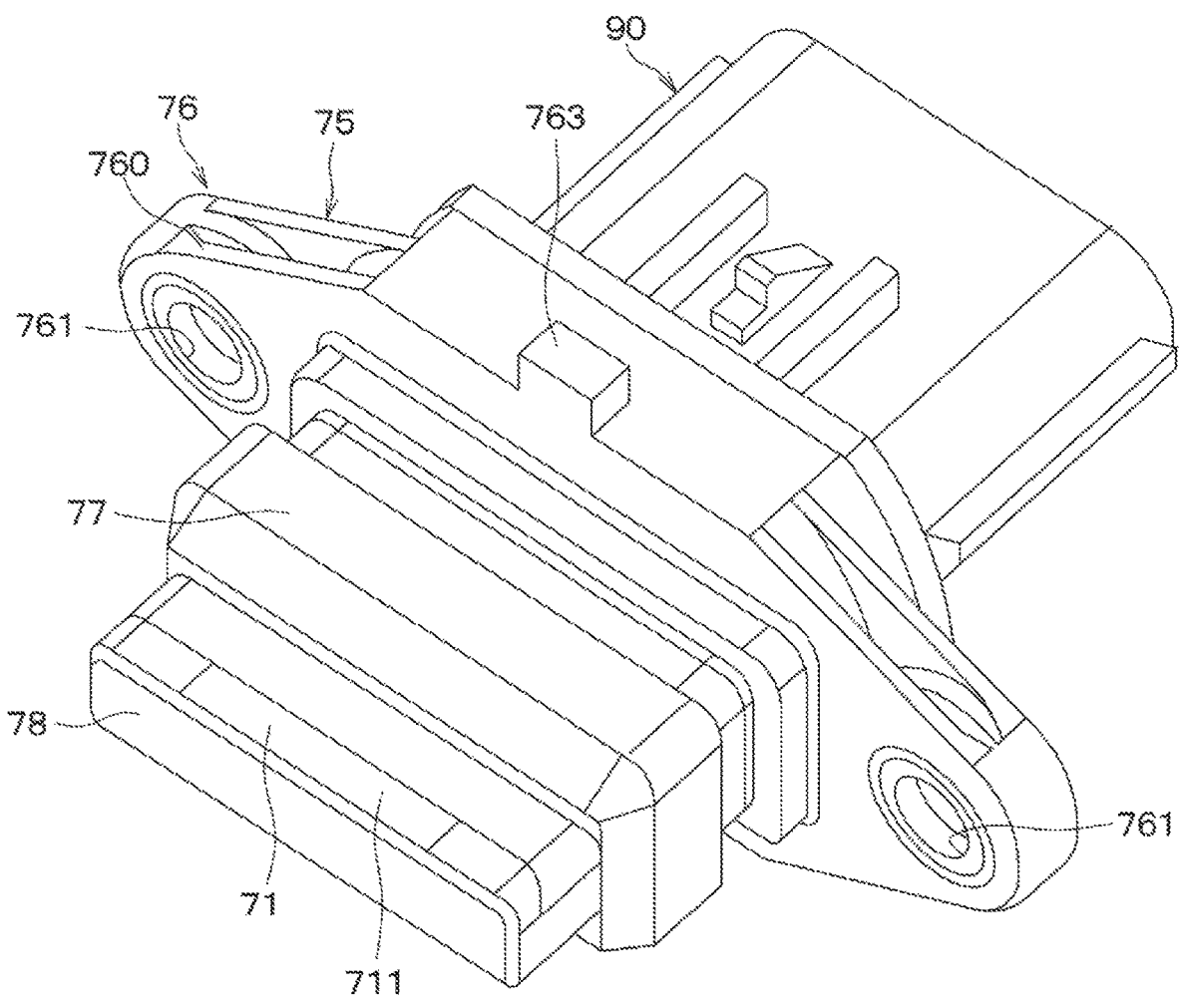
FIG. 17 is a perspective view of a sensor case and a terminal case of the torque sensor.

Furthermore, a distance measured in the axial direction Da between two opposite parts of the inner surface 422 of the second tubular portion 402 is shorter than a distance measured in the direction perpendicular to the axial direction Da between two opposite parts of the inner surface 422 of the second tubular portion 402. As shown in FIG. 17, the insert portion 77 is shaped in a rectangular tubular form and thereby receives a portion of the circuit board 60 and a portion of the first magnetic detector 61. Furthermore, the insert portion 77 is inserted into the third space 413. The shape of the insert portion 77 is not limited to the rectangular tubular form and may be a polygonal tubular form.

The fifth embodiment is configured in the above-described manner. Even in the fifth embodiment, the advantages, which are similar to those of the first embodiment, are achieved.

Sixth Embodiment

Figure 18:
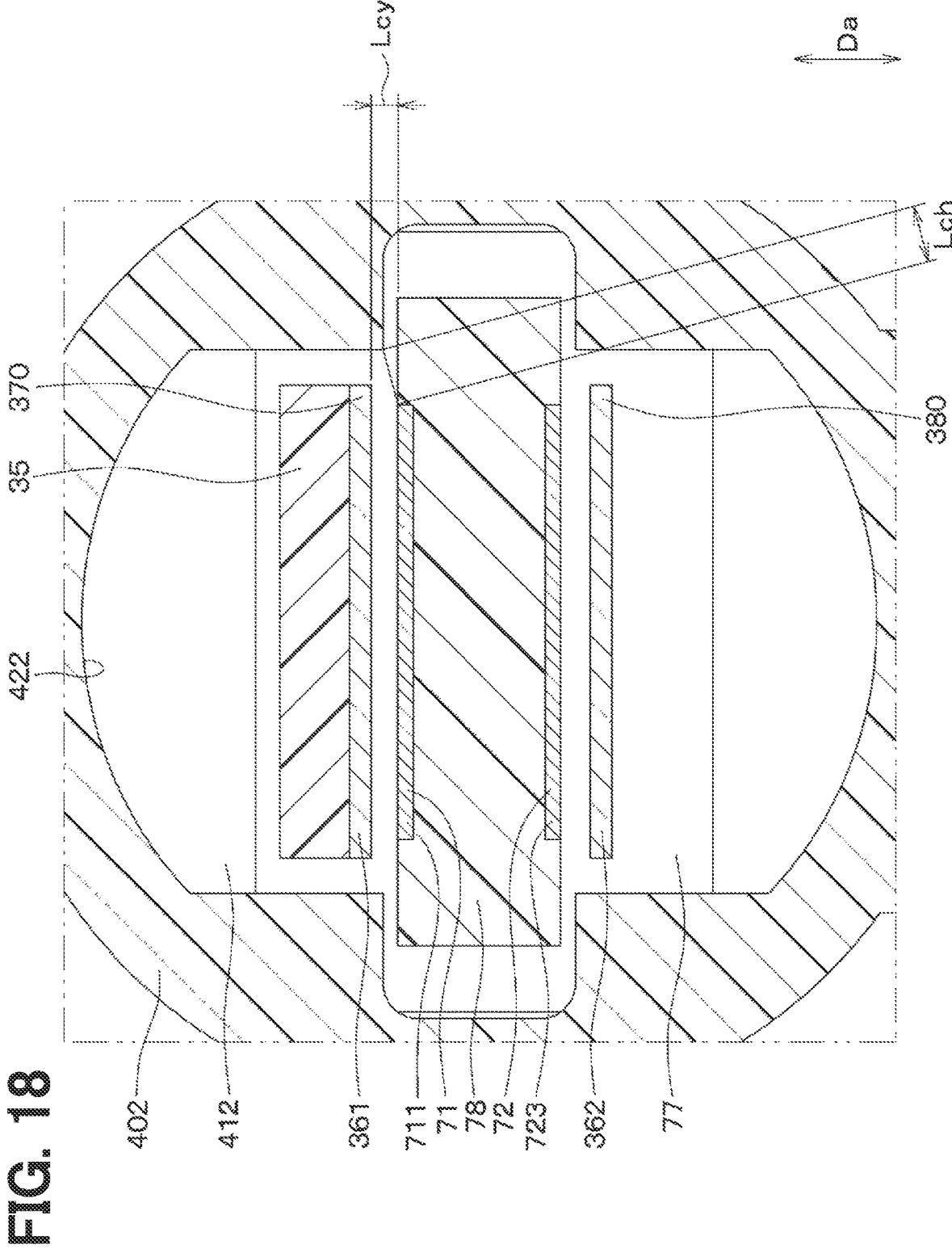
FIG. 18 is a cross-sectional view of a torque sensor of a sixth embodiment.

In a sixth embodiment, the shape of the second space 412 is different from that of the fifth embodiment. The rest of the configuration of the sixth embodiment is the same as that of the fifth embodiment. As shown in FIG. 18, when the second tubular portion 402 is cut in the axial direction Da, a cross-section of the second space 412 has a criss-cross shape. A distance measured in the axial direction Da between two opposite parts of the inner surface 422 of the second tubular portion 402 is equal to or longer than a distance measured in the direction perpendicular to the axial direction Da between two opposite parts of the inner surface 422 of the second tubular portion 402. Furthermore, a shortest distance measured in the axial direction Da from the end of the member support portion 78 to the inner surface 422 of the second tubular portion 402 is shorter than the yoke distance Lcy. The sixth embodiment is configured in the above-described manner. Even in the sixth embodiment, the advantages, which are similar to those of the fifth embodiment, are achieved.

Seventh Embodiment

Figure 19:
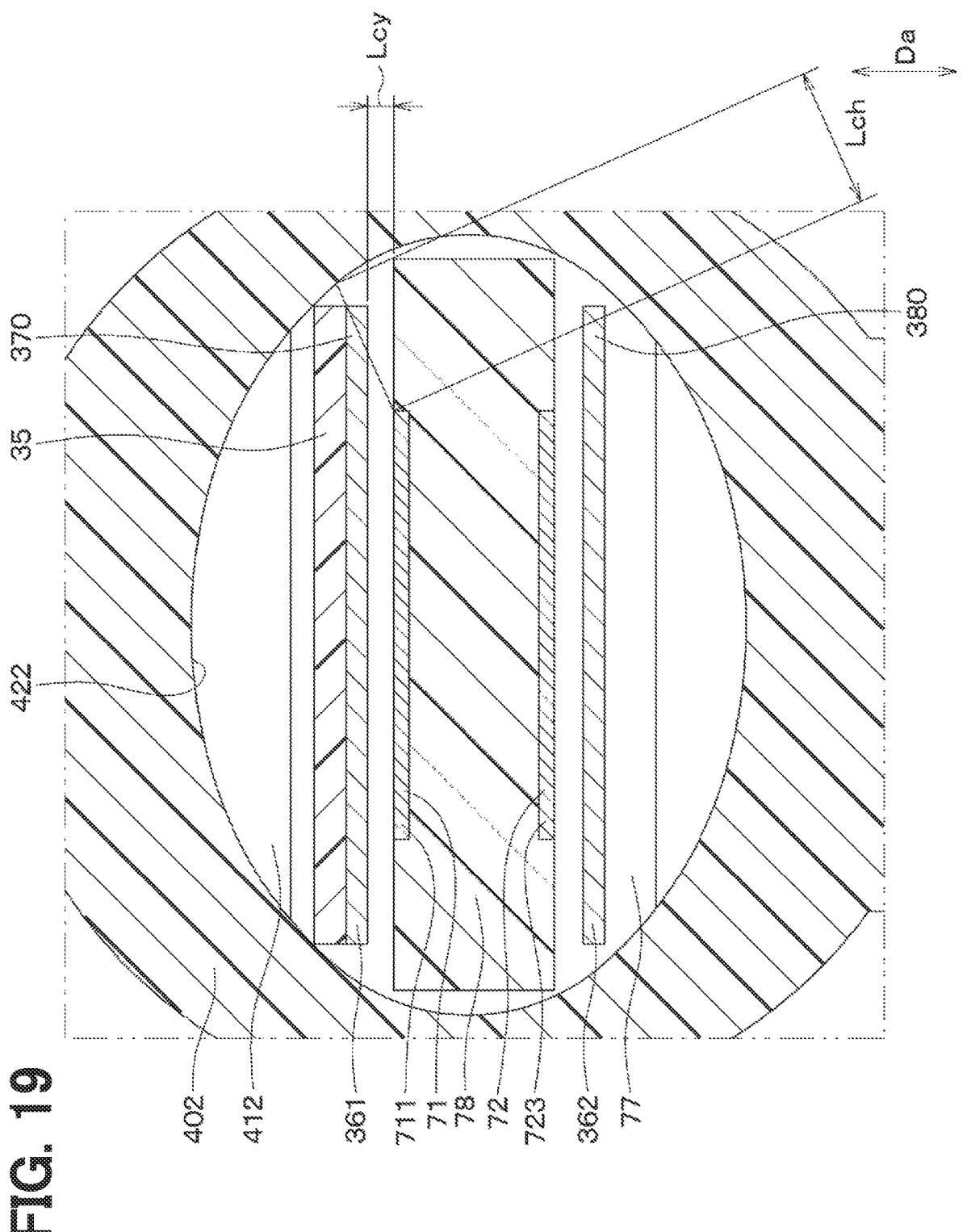
FIG. 19 is a cross-sectional view of a torque sensor of a seventh embodiment.

In a seventh embodiment, the shape of the second space 412 is different from that of the fifth embodiment. The rest of the configuration of the seventh embodiment is the same as that of the fifth embodiment. As shown in FIG. 19, when the second tubular portion 402 is cut in the axial direction Da, a cross-section of the second space 412 has an elliptical shape. A distance measured in the axial direction Da between two opposite parts of the inner surface 422 of the second tubular portion 402 is shorter than a distance measured in the direction perpendicular to the axial direction Da between two opposite parts of the inner surface 422 of the second tubular portion 402. Furthermore, a shortest distance measured in the axial direction Da from the end of the member support portion 78 to the inner surface 422 of the second tubular portion 402 is shorter than the yoke distance Lcy. The seventh embodiment is configured in the above-described manner. Even in the seventh embodiment, the advantages, which are similar to those of the fifth embodiment, are achieved.

Eighth Embodiment

Figure 20:
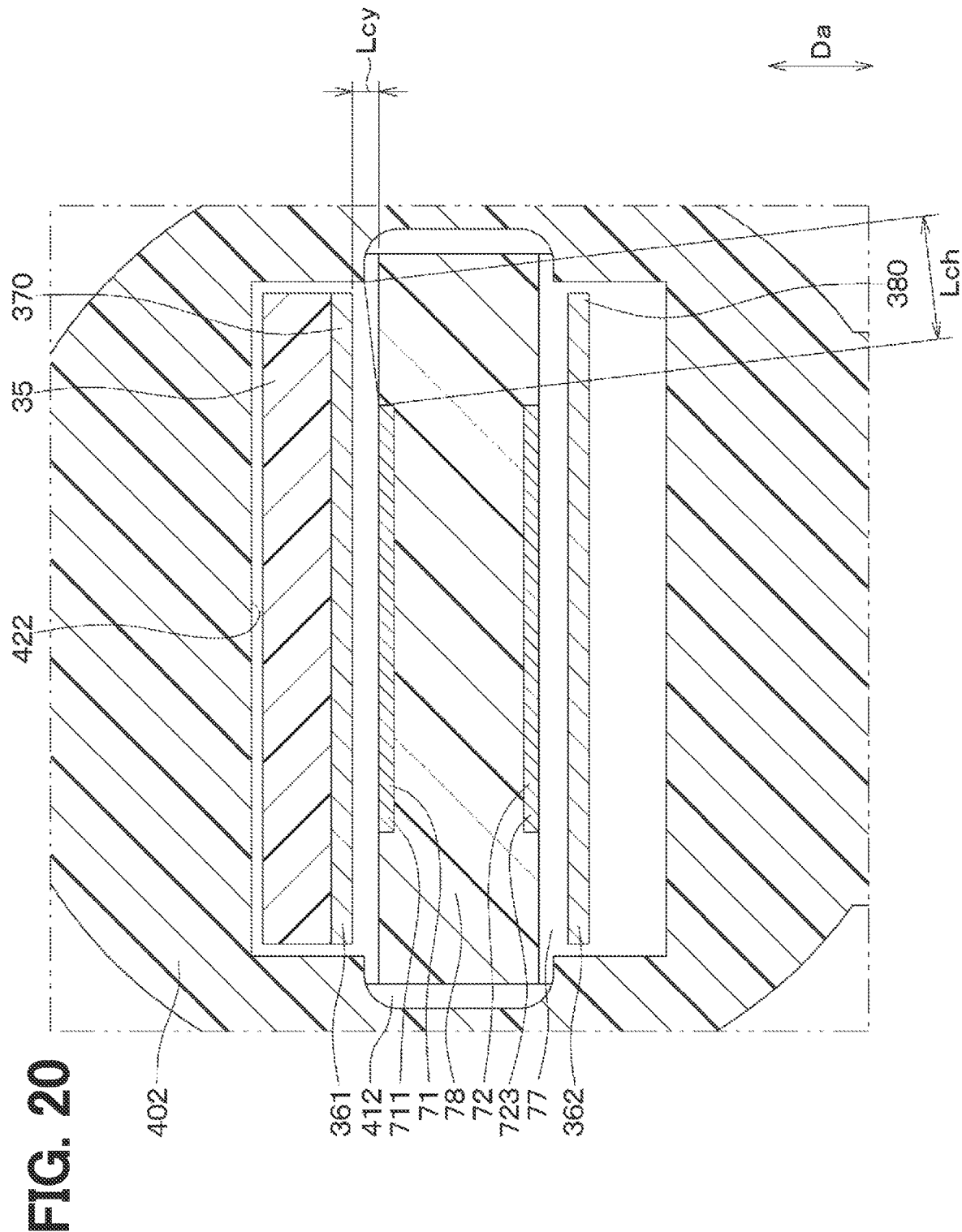
FIG. 20 is a cross-sectional view of a torque sensor of an eighth embodiment.

In an eighth embodiment, the shape of the second space 412 is different from that of the fifth embodiment. The rest of the configuration of the eighth embodiment is the same as that of the fifth embodiment. As shown in FIG. 20, when the second tubular portion 402 is cut in the axial direction Da, a cross-section of the second space 412 has a criss-cross shape. A distance measured in the axial direction Da between two opposite parts of the inner surface 422 of the second tubular portion 402 is shorter than a distance measured in the direction perpendicular to the axial direction Da between two opposite parts of the inner surface 422 of the second tubular portion 402. Furthermore, a shortest distance measured in the axial direction Da from the end of the member support portion 78 to the inner surface 422 of the second tubular portion 402 is shorter than the yoke distance Lcy. The eighth embodiment is configured in the above-described manner. Even in the eighth embodiment, the advantages, which are similar to those of the fifth embodiment, are achieved.

Ninth Embodiment

In a ninth embodiment, the second tubular portion 402 does not have the housing protrusion 403 but has two rotation limiting housing protrusions 423. Furthermore, the flange 76 of the sensor case 75 does not have the rotation limiting flange protrusions 762 but has one flange protrusion 772. The rest of the configuration of the ninth embodiment is the same as that of the first embodiment.

Figure 21:
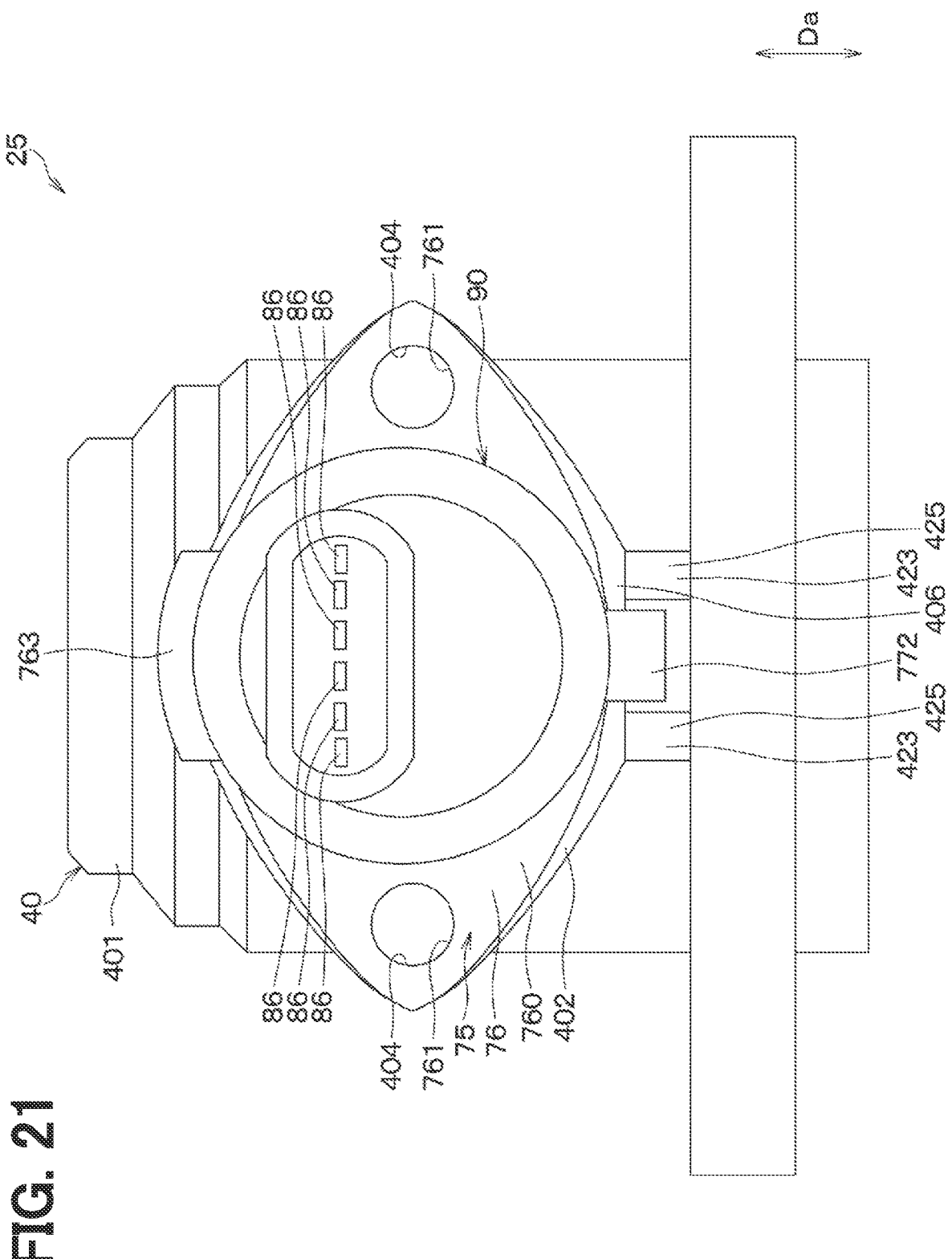
FIG. 21 is an external view of a torque sensor of a ninth embodiment.

As shown in FIG. 21, the rotation limiting housing protrusions 423 outwardly protrude in the radial direction from the end surface 406 of the second tubular portion 402 which is located on the side of the second tubular portion 402 opposite to the first tubular portion 401. The flange protrusion 772 protrudes from the flange tubular portion 760 in the axial direction Da. Furthermore, a length of each rotation limiting housing protrusion 423, which is measured from the end surface 406 of the second tubular portion 402 to a distal end surface 425 of the rotation limiting housing protrusion 423 in the extending direction of the second tubular portion 402, is longer than the overlap length Ls.

The ninth embodiment is configured in the above-described manner. Even in the ninth embodiment, the advantages, which are similar to those of the first embodiment, are achieved. Furthermore, in the ninth embodiment, the following advantages are achieved.

[2-1] The flange protrusion 772 is located between the two rotation limiting housing protrusions 423. The two rotation limiting housing protrusions 423 are configured to limit rotation of the sensor case 75 about the axis, which extends in the extending direction of the second tubular portion 402, when one of the two rotation limiting housing protrusions 423 contacts the flange protrusion 772.

Since the rotation of the sensor case 75 is limited, the relative distance between the first opposing portion 711 of the first magnetic guide member 71 and the first-yoke ring 370 and the relative distance between the third opposing portion 723 of the second magnetic guide member 72 and the second-yoke ring 380 remain constant. Therefore, the sensitivity of the first magnetic detector 61 and the sensitivity of the second magnetic detector 62 can be stabilized.

[2-2] The length of each rotation limiting housing protrusion 423, which is measured from the end surface 406 of the second tubular portion 402 to the distal end surface 425 of the rotation limiting housing protrusion 423 in the extending direction of the second tubular portion 402, is longer than the overlap length Ls. Furthermore, the length of each rotation limiting housing protrusion 423, which is measured from the end surface 406 of the second tubular portion 402 to the distal end surface 425 of the rotation limiting housing protrusion 423 in the extending direction of the second tubular portion 402, is longer than the length of the overlapping section between the member support portion 78 and the second-yoke ring 380 measured in the extending direction of the second tubular portion 402, and this overlapping section between the member support portion 78 and the second-yoke ring 380 is formed when the second-yoke ring 380 is projected onto the member support portion 78 in the axial direction Da.

Therefore, even if the member support portion 78 is displaced in the extending direction of the second tubular portion 402, the flange tubular portion 760 and the end surface 406 of the second tubular portion 402 come into contact each other before the member support portion 78 and the rotor 35 come into contact each other. Thus, interference between the member support portion 78 and the rotor 35 is limited.

Tenth Embodiment

In the tenth embodiment, the flange 76 has two rotation limiting projections 765. Furthermore, the second tubular portion 402 has two rotation limiting holes 415.

Figure 22:
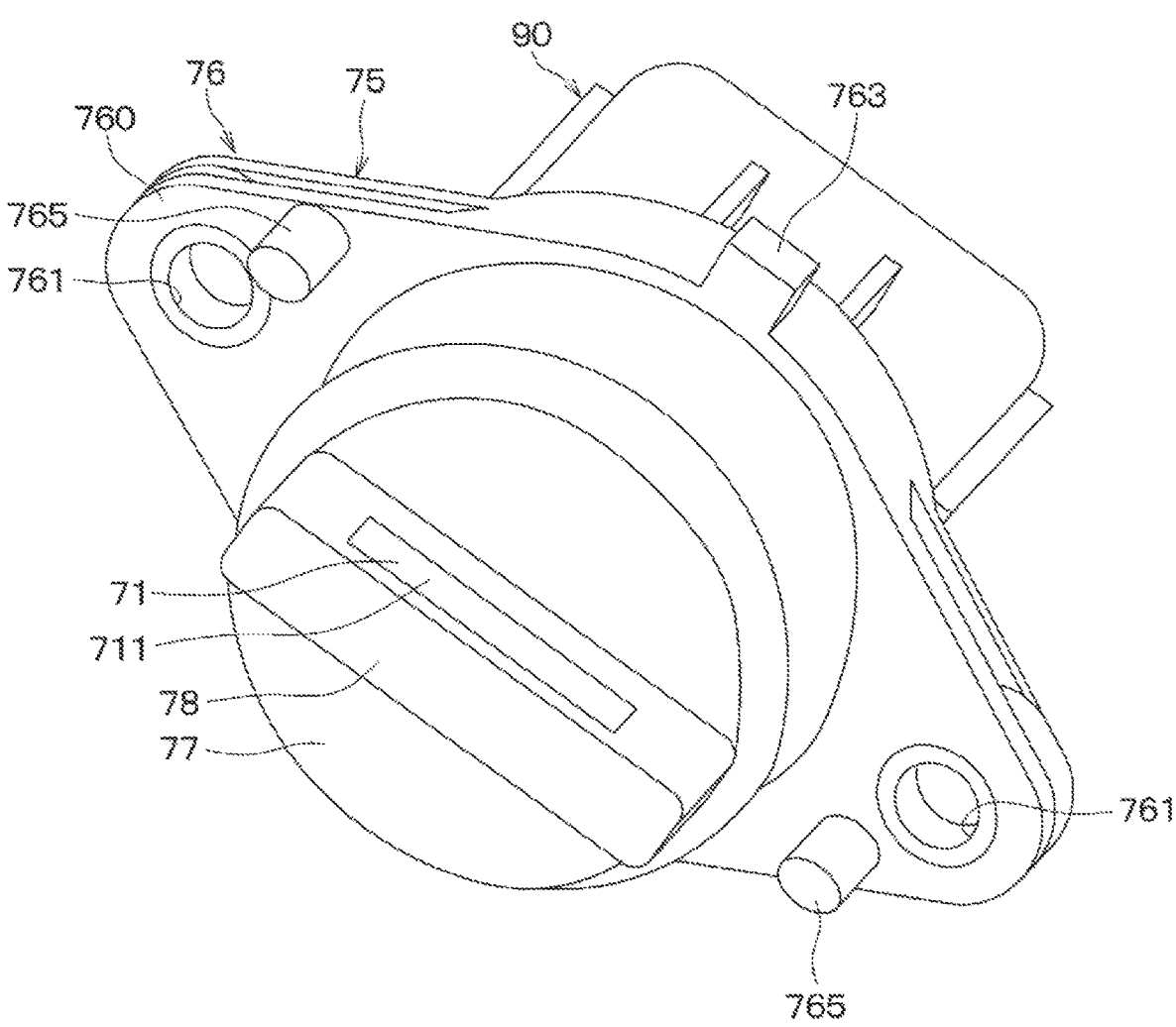
FIG. 22 is a perspective view of a sensor case and a terminal case of a torque sensor of a tenth embodiment.

As shown in FIG. 22, the rotation limiting projections 765 project from the flange tubular portion 760 toward the housing 40. Furthermore, each of the rotation limiting projections 765 is shaped in a cylindrical columnar form. The shape of the rotation limiting projection 765 is not limited to the cylindrical columnar form and may be, for example, a polygonal columnar form or an elliptical columnar form.

Figure 23:
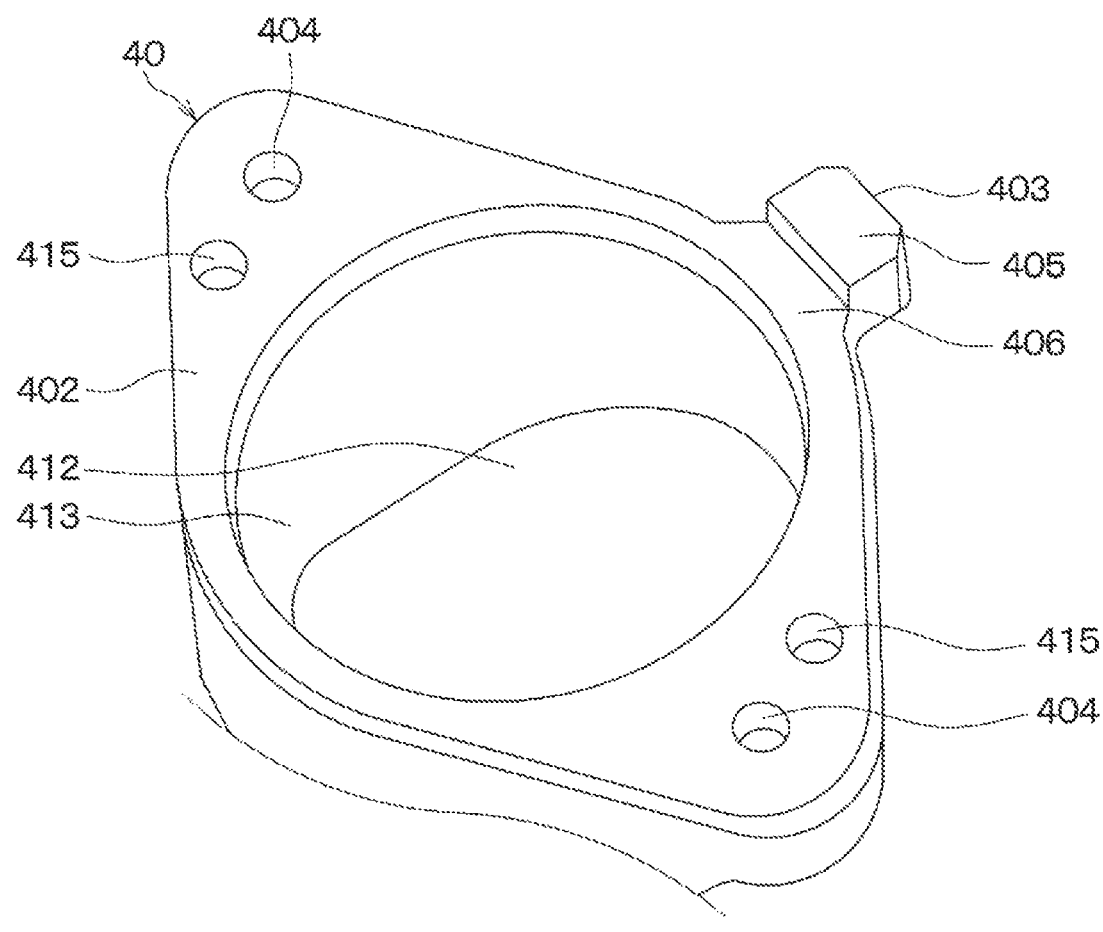
FIG. 23 is a perspective view of a housing of the torque sensor.

As shown in FIG. 23, the rotation limiting holes 415 are formed at the end surface 406 of the second tubular portion 402 at two locations, respectively, which correspond to the rotation limiting projections 765, and each of the rotation limiting holes 415 is shaped to correspond with the shape of the corresponding rotation limiting projection 765.

The tenth embodiment is configured in the above-described manner. Even in the tenth embodiment, the advantages, which are similar to those of the first embodiment, are achieved. Furthermore, in the tenth embodiment, the following advantage is achieved.

[3] The rotation limiting projections 765 are inserted into the rotation limiting holes 415 and thereby limit rotation of the sensor case 75 about the axis which extends in the extending direction of the second tubular portion 402.

Thus, since the rotation of the sensor case 75 is limited, it is possible to limit occurrence of reversal of positive/negative of the signal of the first magnetic detector 61 and the second magnetic detector 62 caused by the change in the orientation of the first magnetic detector 61 and the second magnetic detector 62.

Eleventh Embodiment

In an eleventh embodiment, the flange 76 has two rotation limiting holes 785. Furthermore, the second tubular portion 402 has two rotation limiting projections 435.

Figure 24:
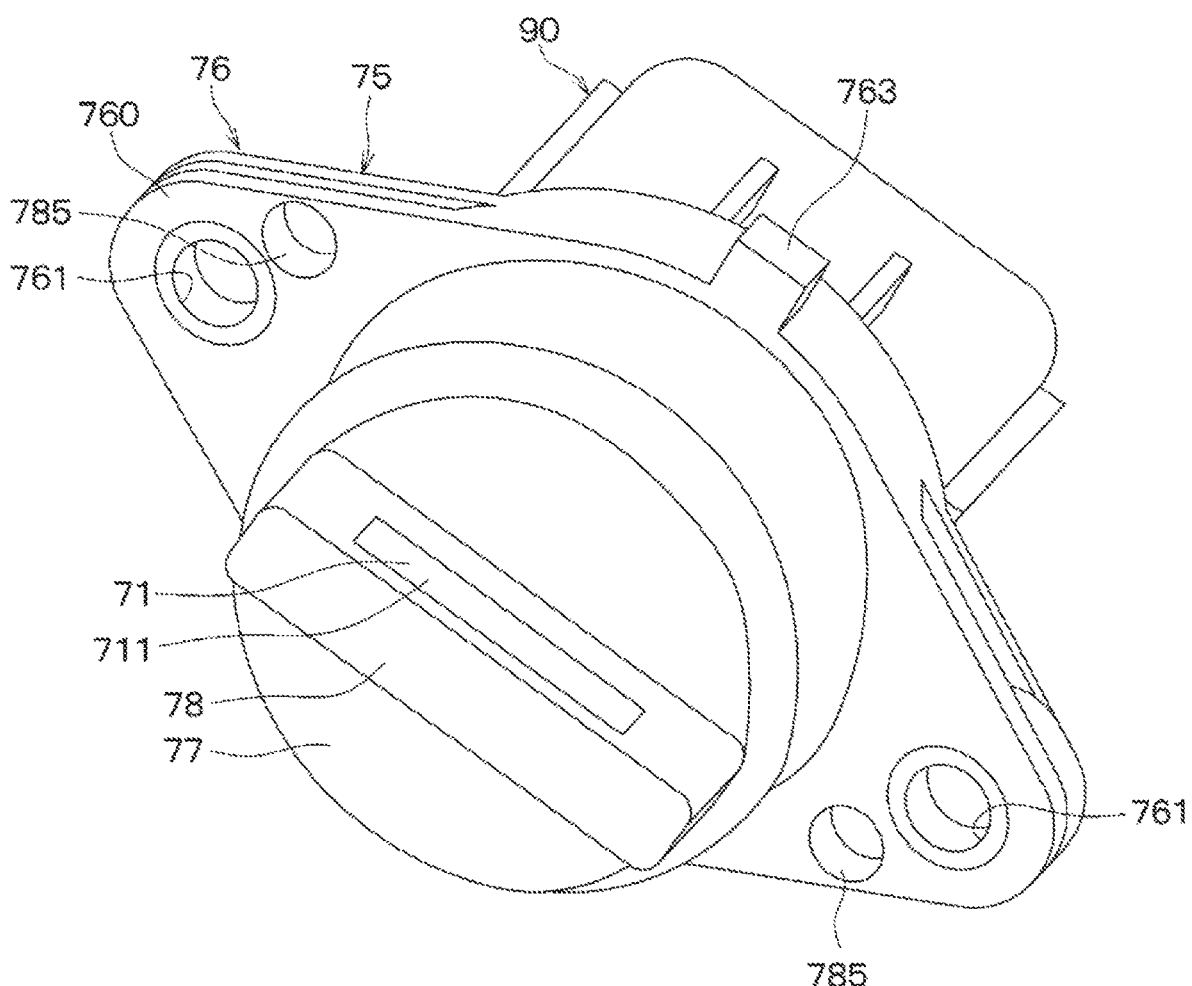
FIG. 24 is a perspective view of a sensor case and a terminal case of a torque sensor of an eleventh embodiment.

As shown in FIG. 24, the rotation limiting holes 785 are formed at the flange tubular portion 760 at two locations, respectively, which correspond to the rotation limiting projections 435, and each of the rotation limiting holes 785 is shaped to correspond with the shape of the corresponding rotation limiting projection 435.

Figure 25:
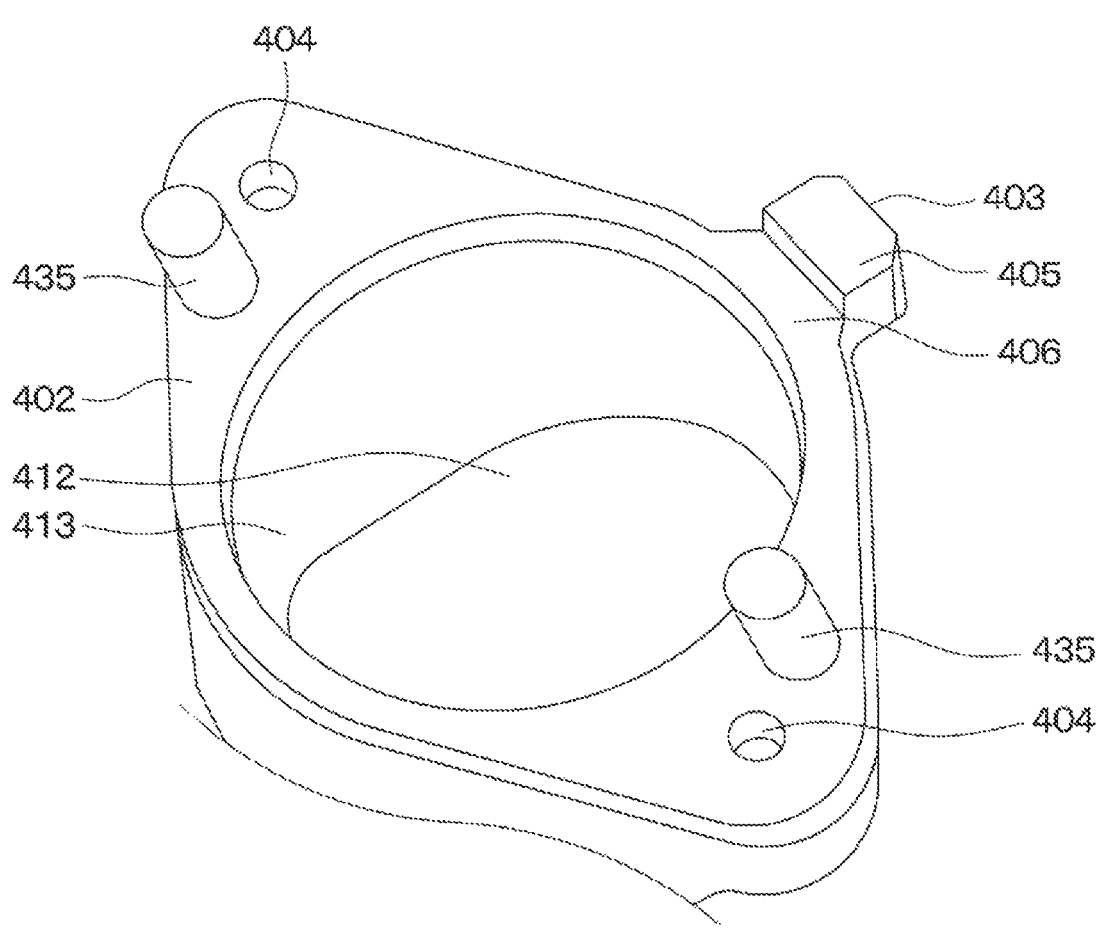
FIG. 25 is a perspective view of a housing of the torque sensor.

As shown in FIG. 25, the rotation limiting projections 435 project from the end surface 406 of the second tubular portion 402 toward the sensor case 75. Furthermore, each of the rotation limiting projections 435 is shaped in a cylindrical columnar form. The shape of the rotation limiting projection 435 is not limited to the cylindrical columnar form and may be, for example, a polygonal columnar form or an elliptical columnar form.

The eleventh embodiment is configured in the above-described manner. Even in the eleventh embodiment, the advantages, which are similar to those of the first embodiment, are achieved. Furthermore, in the eleventh embodiment, the following advantage is achieved.

[4] The rotation limiting projections 435 are inserted into the rotation limiting holes 785 and thereby limit rotation of the sensor case 75 about the axis which extends in the extending direction of the second tubular portion 402.

Thus, since the rotation of the sensor case 75 is limited, it is possible to limit occurrence of reversal of positive/negative of the signal of the first magnetic detector 61 and the second magnetic detector 62 caused by the change in the orientation of the first magnetic detector 61 and the second magnetic detector 62.

Other Embodiments

The present disclosure is not limited to the embodiments described above, and the embodiments described above may be appropriately modified. Needless to say, in each of the embodiments described above, the constituent elements of the embodiment are not necessarily essential except when it is clearly indicated that they are essential and when they are clearly considered to be essential in principle.

In the embodiments described above, the rotor 35 is shaped in the cylindrical tubular form. However, the shape of the rotor 35 is not limited to the cylindrical tubular form. For example, the rotor 35 may be shaped in a polygonal tubular form or an elliptical tubular form.

In the embodiments described above, the first-yoke ring 370 and the second-yoke ring 380 are each shaped in the circular ring form. However, the shape of each of the first-yoke ring 370 and the second-yoke ring 380 is not limited to the circular ring form. For example, each of the first-yoke ring 370 and the second-yoke ring 380 may be shaped in a polygonal ring form.

In the embodiments described above, each of the first-yoke claws 372 and the second-yoke claws 382 is shaped in the tapered form. However, the shape of each of the first-yoke claws 372 and the second-yoke claws 382 is not limited to the tapered form. For example, each of the first-yoke claws 372 and the second-yoke claws 382 may be shaped in an oblong rectangular shape.

In the embodiments described above, the fixation collar 354 is coupled to the second steering shaft 12, and the magnet 30 is coupled to the first steering shaft 11. However, the present disclosure is not limited to the above configuration, i.e., the fixation collar 354 is coupled to the second steering shaft 12, and the magnet 30 is coupled to the first steering shaft 11. For example, the fixation collar 354 may be coupled to the first steering shaft 11, and the magnet 30 may be coupled to the second steering shaft 12.

In the embodiments described above, the flange tubular portion 760 is shaped in the rhombic tubular form. However, the shape of the flange tubular portion 760 is not limited to the rhombic tubular form. For example, the flange tubular portion 760 may be shaped in a cylindrical tubular form or a polygonal tubular form.

In the embodiments described above, the member support portion 78 has the rectangular shape. However, the shape of the member support portion 78 is not limited to the rectangular shape. The member support portion 78 may have, for example, a polygonal shape, a circular shape or an elliptical shape.

Figure 26:
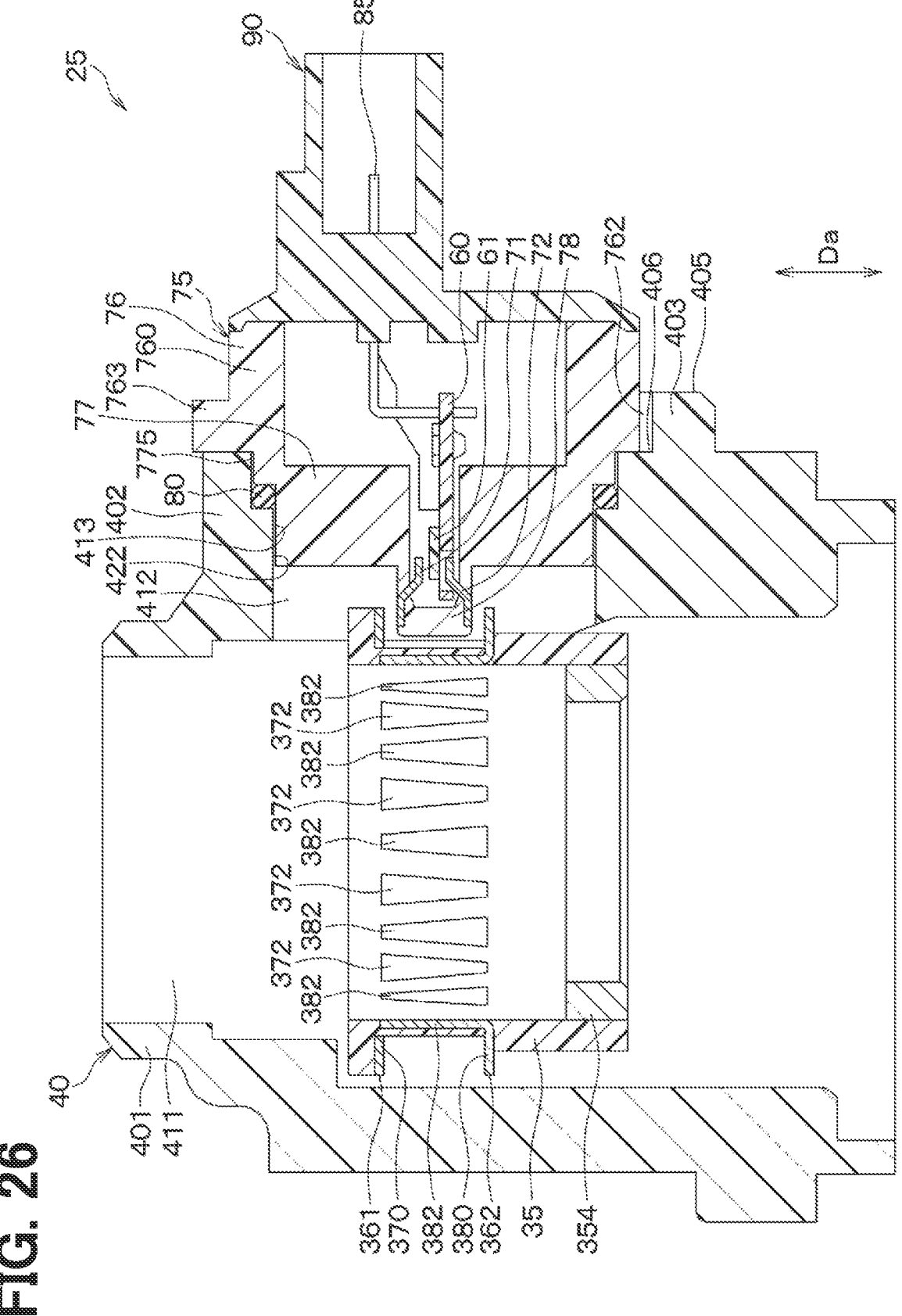
FIG. 26 is a cross-sectional view of a torque sensor of another embodiment.

In the embodiments described above, the elastic member 80 is inserted into the space which is formed by the recess 771 of the insert portion 77 of the sensor case 75. The elastic member 80 is not limited to being inserted into the space which is formed by the recess 771. For example, as shown in FIG. 26, the inner surface 422 of the second tubular portion 402 may be formed in a stepped shape, and the opposing surface 775 of the insert portion 77 may be formed in a stepped shape. The elastic member 80 may be clamped between the inner surface 422 and the opposing surface 775, each formed in the stepped shape, so that the elastic member 80 is elastically deformed. Thereby, as in the above case, the elastic member 80 seals a gap between the inner surface 422 of the second tubular portion 402 and the opposing surface 775 of the insert portion 77 opposed to the inner surface 422. Therefore, intrusion of foreign objects (e.g., dust, water) into the first space 411 and the second space 412 of the housing 40 is limited, and thereby, for example, the first magnetic detector 61 and second magnetic detector 62 are protected from the foreign objects. Thus, the dustproof and waterproof properties of the torque sensor 25 are improved.

In the tenth embodiment, the flange 76 has the two rotation limiting projections 765. Furthermore, the second tubular portion 402 has the two rotation limiting holes 415. However, the number of the rotation limiting projections 765 and the number of the rotation limiting holes 415 are not each limited to two, and it is only required that the number of the rotation limiting projection(s) 765 and the number of the rotation limiting hole(s) 415 are each one or more.

In the eleventh embodiment, the flange 76 has the two rotation limiting holes 785. Furthermore, the second tubular portion 402 has the two rotation limiting projections 435. However, the number of the rotation limiting holes 785 and the number of the rotation limiting projections 435 are not each limited to two, and it is only required that the number of the rotation limiting hole(s) 785 and the number of the rotation limiting projection(s) 435 are each one or more.

The embodiments described above may be combined as appropriate.

What is claimed is:

1. A torque detection device configured to detect a torque generated at a detection subject, comprising:
   a magnet that is configured to generate a magnetic field and is configured to be rotated together with the detection subject;
   a rotor that is configured to be rotated together with the detection subject;
   a yoke that has:
      a ring which is shaped in a ring form and is configured to be rotated together with the rotor; and
      a plurality of claws which project from the ring in an axial direction of the rotor and are thereby opposed to the magnet in a direction perpendicular to the axial direction, wherein the plurality of claws are configured to be rotated together with the ring and thereby change the magnetic field generated by the magnet;
   a magnetic detector that is configured to detect a strength of the magnetic field while the strength of the magnetic field corresponds to the torque and changes in response to rotation of the plurality of claws;
   a guide member that is configured to guide the magnetic field, which changes in response to the rotation of the plurality of claws, to the magnetic detector;
   a case that has a member support portion which is shaped in a bottomed tubular form and receives the magnetic detector, wherein the member support portion covers the guide member and thereby supports the guide member; and a housing that has:
      a first tubular portion which is shaped in a tubular form and extends in the axial direction, wherein the first tubular portion receives the magnet, the rotor and the yoke; and
      a second tubular portion which is shaped in a tubular form and extends in an extending direction of the second tubular portion that is perpendicular to the axial direction, wherein the second tubular portion receives the member support portion, wherein:
   the guide member has an opposing portion, wherein the opposing portion overlaps with the ring when the ring is projected onto the opposing portion in the axial direction, and the opposing portion overlaps with an inner surface of the second tubular portion when the inner surface of the second tubular portion is projected onto the opposing portion in the axial direction; and
   a shortest distance measured from the opposing portion to the inner surface of the second tubular portion is longer than a shortest distance measured from the opposing portion to the ring.

2. The torque detection device according to claim 1, wherein:
   the case has an insert portion, wherein the insert portion is joined to the member support portion in the extending direction of the second tubular portion and is inserted into the second tubular portion; and
   a distance measured in the axial direction from the opposing portion to the ring is longer than a distance measured in the axial direction from the inner surface of the second tubular portion to an opposing surface of the insert portion that is opposed to the inner surface of the second tubular portion in the axial direction.

3. The torque detection device according to claim 1, wherein:
   the case has:
      an insert portion that is joined to the member support portion in the extending direction of the second tubular portion and is inserted into the second tubular portion; and
      a flange that is joined to an opposite part of the insert portion, which is opposite to the member support portion, in the extending direction of the second tubular portion;
   the second tubular portion has:
      an end surface that is located on a side of the second tubular portion which is opposite to the first tubular portion, wherein the end surface faces in the extending direction of the second tubular portion; and
      a housing protrusion that protrudes from the end surface in the extending direction of the second tubular portion;
   the flange has:
      a flange tubular portion that is shaped in a tubular form and is opposed to the end surface of the second tubular portion in the extending direction of the second tubular portion; and
      two flange protrusions which protrude from the flange tubular portion in the axial direction; and
   the housing protrusion is located between the two flange protrusions and thereby limits rotation of the case about an axis, which extends in the extending direction of the second tubular portion, when the housing protrusion contacts one of the two flange protrusions.

4. The torque detection device according to claim 3, wherein a length of the housing protrusion measured from the end surface of the second tubular portion to a distal end surface of the housing protrusion in the extending direction of the second tubular portion is longer than a length of an overlapping section between the member support portion and the ring measured in the extending direction of the second tubular portion while the overlapping section between the member support portion and the ring is formed when the ring is projected onto the member support portion in the axial direction.

5. The torque detection device according to claim 3, wherein the flange has a protrusion that protrudes in the axial direction from an opposite part of the flange tubular portion which is opposite to the two flange protrusions.

6. The torque detection device according to claim 1, wherein:

the case has:
an insert portion that is joined to the member support portion in the extending direction of the second tubular portion and is inserted into the second tubular portion; and
a flange that is joined to an opposite part of the insert portion, which is opposite to the member support portion, in the extending direction of the second tubular portion;

the second tubular portion has:
an end surface that is located on a side of the second tubular portion which is opposite to the first tubular portion, wherein the end surface faces in the extending direction of the second tubular portion; and
two housing protrusions that protrude from the end surface in the extending direction of the second tubular portion;

the flange has:
a flange tubular portion that is shaped in a tubular form and is opposed to the end surface of the second tubular portion in the extending direction of the second tubular portion; and
a flange protrusion that protrudes from the flange tubular portion in the axial direction;

the flange protrusion is located between the two housing protrusions; and
the two housing protrusions are configured to limit rotation of the case about an axis, which extends in the extending direction of the second tubular portion, when one of the two housing protrusions contacts the flange protrusion.

7. The torque detection device according to claim 6, wherein a length of each of the two housing protrusions measured from the end surface of the second tubular portion to a distal end surface of each of the two housing protrusions in the extending direction of the second tubular portion is longer than a length of an overlapping section between the ring and the opposing portion measured in the extending direction of the second tubular portion while the overlapping section between the ring and the opposing portion is formed when the ring is projected onto the opposing portion in the axial direction.

8. The torque detection device according to claim 1, wherein:

the case has:
an insert portion that is joined to the member support portion in the extending direction of the second tubular portion and is inserted into the second tubular portion; and
a flange that is joined to an opposite part of the insert portion, which is opposite to the member support portion, in the extending direction of the second tubular portion;

the second tubular portion has:
an end surface that is located on a side of the second tubular portion which is opposite to the first tubular portion, wherein the end surface faces in the extending direction of the second tubular portion; and
a hole that is formed at the end surface;

the flange has:
a flange tubular portion that is shaped in a tubular form and is opposed to the end surface of the second tubular portion in the extending direction of the second tubular portion; and
a projection that projects from the flange tubular portion toward the housing; and the projection of the flange is inserted into the hole of the second tubular portion and thereby limits rotation of the case about an axis which extends in the extending direction of the second tubular portion.

9. The torque detection device according to claim 1, wherein:

the case has:
an insert portion that is joined to the member support portion in the extending direction of the second tubular portion and is inserted into the second tubular portion; and
a flange that is joined to an opposite part of the insert portion, which is opposite to the member support portion, in the extending direction of the second tubular portion;

the second tubular portion has:
an end surface that is located on a side of the second tubular portion which is opposite to the first tubular portion, wherein the end surface faces in the extending direction of the second tubular portion; and
a projection that projects from the end surface toward the case;

the flange has:
a flange tubular portion that is shaped in a tubular form and is opposed to the end surface of the second tubular portion in the extending direction of the second tubular portion; and
a hole that is formed at the flange tubular portion; and the projection of the second tubular portion is inserted into the hole of the flange and thereby limits rotation of the case about an axis which extends in the extending direction of the second tubular portion.

10. The torque detection device according to claim 8, wherein:

the second tubular portion has a housing protrusion that protrudes from the end surface of the second tubular portion in the extending direction of the second tubular portion; and a length of the housing protrusion measured from the end surface of the second tubular portion to a distal end surface of the housing protrusion in the extending direction of the second tubular portion is longer than a length of an overlapping section between the ring and the opposing portion measured in the extending direction of the second tubular portion while the overlapping section between the ring and the opposing portion is formed when the ring is projected onto the opposing portion in the axial direction.

11. The torque detection device according to claim 9, wherein:

the second tubular portion has a housing protrusion that protrudes from the end surface of the second tubular portion in the extending direction of the second tubular portion; and a length of the housing protrusion measured from the end surface of the second tubular portion to a distal end surface of the housing protrusion in the extending direction of the second tubular portion is longer than a length of an overlapping section between the ring and the opposing portion measured in the extending direction of the second tubular portion while the overlapping section between the ring and the opposing portion is formed when the ring is projected onto the opposing portion in the axial direction.

* * * * *